United States Patent [19]

Worley, III et al.

[11] Patent Number: 5,805,576
[45] Date of Patent: Sep. 8, 1998

[54] METHOD AND APPARATUS FOR TDMA WIRELESS COMMUNICATION EMPLOYING COLLECTOR ARRAYS FOR RANGE EXTENSION

[75] Inventors: William Spencer Worley, III, Half Moon Bay; David Amundson Howard, Mountain View; Karen Evelyn Coates, San Jose; John Andrew Vastano, Palo Alto, all of Calif.

[73] Assignee: Cellular Telecom, Ltd., Mountain View, Calif.

[21] Appl. No.: 634,141

[22] Filed: Apr. 19, 1996

Related U.S. Application Data

[63] Continuation-in-part of Ser. No. 544,913, Oct. 18, 1995.
[51] Int. Cl.$^6$ .................................................. H04J 3/16
[52] U.S. Cl. .............................................................. 370/337
[58] Field of Search .................................... 370/319, 321, 370/329, 337, 347, 350, 503, 507; 455/54.1, 33.1, 56.1, 51.1, 422, 524; 375/354, 356; 379/59, 60

[56] References Cited

U.S. PATENT DOCUMENTS

| | | |
|---|---|---|
| 4,797,947 | 1/1989 | Labedz . |
| 5,168,502 | 12/1992 | Millet . |
| 5,233,643 | 8/1993 | Nacini et al. . |
| 5,239,677 | 8/1993 | Jasinski ................................. 455/34.1 |
| 5,293,380 | 3/1994 | Kondo ................................... 370/350 |
| 5,299,198 | 3/1994 | Kay et al. . |
| 5,363,376 | 11/1994 | Chuang et al. ........................ 370/350 |
| 5,533,028 | 7/1996 | Hita de la Torre et al. ............. 370/350 |
| 5,537,683 | 7/1996 | Hill et al. . |
| 5,539,749 | 7/1996 | Eul . |
| 5,548,806 | 8/1996 | Yamaguchi et al. . |

FOREIGN PATENT DOCUMENTS

| | | |
|---|---|---|
| 0673177 | 9/1995 | European Pat. Off. . |
| 0689303 | 12/1995 | European Pat. Off. . |
| WO 91/00660 | 1/1991 | WIPO . |
| 93 12590 | 6/1993 | WIPO . |
| 93 14579 | 7/1993 | WIPO . |
| 94 26074 | 11/1994 | WIPO . |
| 94 27161 | 11/1994 | WIPO . |

*Primary Examiner*—Douglas W. Olms
*Assistant Examiner*—Ajit Patel
*Attorney, Agent, or Firm*—David E. Lovejoy

[57] ABSTRACT

TDMA communication system having forward channel communications and corresponding reverse channel communications between mobile users and a zone manager in an arbitrarily large broadcaster zone established by a broadcaster. The users are located within the broadcaster zone and the collectors are distributed in proximity to the broadcaster zone. The zone manager operates to control the selection of users to form user groups and for selecting collectors to form collector groups such that the difference between the propagation times from broadcaster to user to collector among users active with the same collector does not exceed a synchronization error such that user reverse channel signals at the collector are isolated from each other. Users are selected such that each of the users in the user group are located at a distance from each of said other users in the user group not greater than a distance $UR_{max}$. Collectors are selected such that each of the collectors in a collector group is located at a distance from each of the other collectors in the collector group not greater than a distance $C_{max}$ where $CR_{max}$ is a value such that user reverse channel signals at the collectors are isolated.

62 Claims, 8 Drawing Sheets

METHOD AND APPARATUS FOR TDMA WIRELESS COMMUNICATION EMPLOYING COLLECTOR ARRAYS FOR RANGE EXTENSION

CROSS REFERENCE

This application is a continuation-in-part of application SC/Ser. No. 08/544,913 filed Oct. 18, 1995 entitled METHOD AND APPARATUS FOR WIRELESS COMMUNICATION EMPLOYING COLLECTOR ARRAYS, assigned to the same assignee as this application.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to the field of two-way wireless communication systems and more specifically to methods and apparatus for communication with mobile telephone users (cellular and personal communication systems), basic exchange telecommunications radio, wireless data communications, two-way paging and other wireless systems.

Conventional Cellular Systems

The present day cellular mobile telephone system developed due to a large demand for mobile services that could not be satisfied by earlier systems. The cellular system "reuses" frequency within a system of cells to provide wireless two-way radio frequency (RF) communication to large numbers of users. Each cell covers a small geographic area and collectively an array of adjacent cells covers a larger geographic region. Each cell has a dedicated fraction of the total amount of RF spectrum which is used to support cellular users located in the cell. Cells are of different sizes (for example, macro-cell or micro-cell) and are generally fixed in capacity. The actual shapes and sizes of cells are complex functions of the terrain, the man-made environment, the quality of communication and the user capacity required. Cells are connected to each other via land lines or microwave links and to the public-switched telephone network (PSTN) through telephone switches that are adapted for mobile communication. The switches provide for the hand-off of users from cell to cell and thus from frequency to frequency as mobile users move between cells.

In conventional cellular systems, each cell has a base station with RF transmitters and RF receivers co-sited for transmitting and receiving communications to and from cellular users in the cell. The base station employs forward RF frequency bands (carriers) to transmit forward channel communications to users and employs reverse RF carriers to receive reverse channel communications from users in the cell. Conventional forward channel communications are static in that they employ fixed power, at fixed frequencies and have fixed sectors if sectorized antennas are used.

The forward and reverse channel communications use separate frequency bands so that simultaneous transmissions in both directions are possible. This operation is referred to as frequency domain duplex (FDD) signaling. Although time domain duplex (TDD) signaling, in which the forward and reverse channels take turns using the same frequency band is possible, such operation is not part of any widespread current cellular implementation.

The base station in addition to providing RF connectivity to users also provides connectivity to a Mobile Telephone Switching Office (MTSO). In a typical cellular system, one or more MTSO's will be used over the coverage region. Each MTSO can service a number of base stations and associated cells in the cellular system and supports switching operations for routing calls between other systems (such as the PSTN) and the cellular system or for routing calls within the cellular system.

Base stations are typically controlled from the MTSO by means of a Base Station Controller (BSC). The BSC assigns RF carriers to support calls, coordinates the handoff of mobile users between base stations, and monitors and reports on the status of base stations. The number of base stations controlled by a single MTSO depends upon the traffic at each base station, the cost of interconnection between the MTSO and the base stations, the topology of the service area and other similar factors.

A handoff between base stations occurs, for example, when a mobile user travels from a first cell to an adjacent second cell. Handoffs also occur to relieve the load on a base station that has exhausted its traffic-carrying capacity or where poor quality communication is occurring. The handoff is a communication transfer for a particular user from the base station for the first cell to the base station for the second cell. During the handoff in conventional cellular systems, there is a transfer period of time during which the forward and reverse communications to the mobile user are severed with the base station for the first cell and are not established with the second cell. A typical conventional cellular system has the transfer period designed to be less than 100 milliseconds.

Conventional cellular implementations employ one of several techniques to reuse RF bandwidth from cell to cell over the cellular domain. The power received from a radio signal diminishes as the distance between transmitter and receiver increases. All of the conventional frequency reuse techniques rely upon power fading to implement reuse plans. In a frequency division multiple access (FDMA) system, a communications channel consists of an assigned particular frequency and bandwidth (carrier) for continuous transmission. If a carrier is in use in a given cell, it can only be reused in cells sufficiently separated from the given cell so that the reuse site signals do not significantly interfere on the carrier in the given cell. The determination of how far away reuse sites must be and of what constitutes significant interference are implementation-specific details. The cellular Advanced Mobile Phone System (AMPS) currently in use in the United States employs FDMA communications between base stations and mobile cellular telephones.

In time division multiple access (TDMA) systems, multiple channels are defined using the same carrier. The separate channels each transmit discontinuously in bursts which are timed so as not to interfere with the other channels on that carrier. Typically, TDMA implementations also employ FDMA techniques. Carriers are reused from cell to cell in an FDMA scheme, and on each carrier, several channels are defined using TDMA methods.

In code division multiple access (CDMA) systems, multiple channels are defined using the same carrier and with simultaneous broadcasting. The transmissions employ coding schemes such that to a given channel on a given carrier, the power from all other channels on that carrier appears to be noise evenly distributed across the entire carrier bandwidth. One carrier may support many channels and carriers may be reused in every cell.

In space division multiple access (SDMA) systems, one carrier is reused several times over a cellular domain by use of adaptive or spot beam-forming antennas for either terrestrial or space-based transmitters.

TDMA Conventional Cellular Architectures

In TDMA systems, time is divided into time slots of a specified duration. Time slots are grouped into frames, and the homologous time slots in each frame are assigned to the same channel. It is common practice to refer to the set of homologous time slots over all frames as a time slot. Each logical channel is assigned a time slot or slots on a common carrier band. The radio transmissions carrying the communications over each logical channel are thus discontinuous. The radio transmitter is off during the time slots not allocated to it.

Each separate radio transmission, which should occupy a single time slot, is called a burst. Each TDMA implementation defines one or more burst structures. Typically, there are at least two burst structures, namely, a first one for the initial access and synchronization of a user to the system, and a second one for routine communications once a user has been synchronized. Examples of such structures are given in FIGS. 2 and 3. Strict timing must be maintained in TDMA systems to prevent the bursts comprising one logical channel from interfering with the bursts comprising other logical channels in the adjacent time slots. When bursts do not interfere, they are said to be isolated. Burst-to-burst isolation may be quantified in several ways. One measure is the minimum signal-to-interference ratio between the burst intended for a time slot and the bursts intended for the preceding and following time slots, said minimum ratio being taken over the information-carrying length of the burst in question. If this ratio never drops below an implementation-specific value, the burst is said to be isolated from the adjacent bursts. In the event that this safety margin is violated, another measure of isolation is the fraction of the total burst for which the margin is violated. This measure may be a weighted measure if the importance of data or the degree of coding protection afforded the data varies over the length of the burst. Data variation over the burst is typical in TDMA implementations.

The isolation of one burst from the preceding and following bursts is crucial for TDMA systems. The defined burst structures are constructed to assist in the isolation process. A burst theoretically cannot completely fill its allotted time slot because radio transmitters neither commence nor cease transmitting instantaneously. TDMA implementations therefore allow time for radio signal strength to ramp up and to ramp down in each of the defined burst structures. During normal communications to and from a synchronized user, each burst does not quite fill its specified time slot. A guard period, $T_G$, is inserted before or after each normal burst to allow for timing mismatches, multipath delays, and inaccuracies within the system. The initial synchronization bursts for accessing the system fill even less of a time slot than do normal bursts. The long guard period, $T_{LG}$, for synchronization bursts is used to overcome the timing mismatches caused by the unknown separation between a user and the base station.

Within a cell, the base station maintains a time base which users synchronize to during initial access. User synchronization to a particular base station is achieved using synchronization bursts sent periodically on a specific carrier by that base station and the reply synchronization bursts sent by the user. Those reply transmissions will arrive delayed at the given base station by the propagation time for radio signals over the separation between the user and the given base station. The separation is generally unknown because the users are mobile. Not only is a burst delayed, but in the cellular multipath environment, multiple copies of the burst are received over some delay spread corresponding to multipath reception over reflected paths of varying lengths. A digital signal processing technique known as equalization is commonly used in RF communications to correct for multipath delay spreading and fading. After equalization, the base station can measure a single skewing delay time for the user synchronization burst. The base station then commands the user to correct for this delay time by time advancing the user bursts by an equal time interval. Thus each individual user has a time base set by the base station to ensure that the transmissions from all users will arrive back at the base station in synchronization with the base station time base.

These burst structures are detailed for two typical conventional cellular TDMA implementations. Under the European-defined "Global system for mobile communications" (GSM) standard, which is substantially copied in the United States within the PCS 1900 standard, each RF carrier occupies 200 kHz of bandwidth. Each carrier is divided into time slots of 577 μs, organized into 8-slot frames lasting 4.615 ms. Each physical channel receives one time slot per frame, and a variety of logical channels may be constructed on a physical channel. The digital coding scheme used in GSM has a bit length of 3.69 μs. A normal speech burst consists of 148 bits of information followed by 8.25 bits of guard time. Thus for GSM, the standard is $T_G$=8.25 bits= 30.44 μs. The reverse channel synchronization (in GSM terminology, the random access) burst has 88 bits of signaling information followed by 68.25 bits of guard time. Thus for GSM, the $T_{LG}$=68.25 bits=252 μs.

Under the IS136 TDMA standard, each RF carrier occupies 30 kHz of bandwidth. Each carrier is divided into time slots of 6.67 ms, organized into 6-slot frames lasting 40 ms. Each logical channel receives two time slots per frame. The bit length for IS136 is 20.58 μs. A normal reverse channel burst consists of 6 guard bits, 6 ramp bits, and 312 bits of mixed control signaling and data. Thus for IS136, $T_G$=6 bits=123.48 μs. The reverse channel synchronization burst has a longer guard period of 38 bits, so that $T_{LG}$=38 bits=782.0 μs for IS136.

The $T_G$ and $T_{LG}$ are principally used to counteract the effects of propagation path travel time and delay spread. These effects are collectively referred to as user time skew. Given the speed of light as approximately $3 \times 10^8$ m/s, the maximum path lengths, $D_G$ and $D_{LG}$, are derived for which the guard periods will compensate for the user time skew. For GSM, $T_G$=30.44 μs so that $D_G$=9.13 km. Similarly, $T_{LG}$=252 μs so that $D_{LG}$=75.6 km. For IS136, $T_G$=123.48 μs, $D_G$=37.5 km, $T_{LG}$=782.0 μs, and $D_{LG}$=234.6 km. As an additional constraint for GSM, the maximum timing advance which can be commanded for a user is 64 bits= 236.2 μs, which equates to 70.85 km. Both the GSM and IS136 TDMA cellular implementations use equalization and convolutional coding to correct for multipath delay spreading of a burst. However, if delayed versions of a burst arrive more than $T_G$ late, they may interfere with the burst from another source intended to arrive in the following slot. Typically, signals arriving on paths many microseconds longer than the shortest path, which is the straight-line path, are received with much lower strength than the earlier signals, and the burst-to-burst interference is thus tolerable.

In general for all current TDMA implementations, a maximum cell radius exists beyond which it is not possible to synchronize users. The maximum synchronization radius, $R_{synch\text{-}max}$ is found by dividing $D_{LG}$ by 2, since the delay found for the initial synchronization burst is equal to the round-trip travel time from the base station to the user and back. For longer travel time, the initial synchronization bursts are not completed prior to the end of the time slot in which they are to be received, and the system will not recognize the communication as a request for synchronization. Thus $R_{synch-max}$=35.4 km for GSM implementations and $R_{synch-max}$=117.3 km for IS136 implementations. These distances define the cell sizes. If larger cells are desired, then channel assignment schemes which leave empty time slots between all pairs of time slots in use can be employed, but such operation is at the expense of capacity.

In accordance with the above background, the cell size and capacity problems resulting from user signal skew create a need for improved wireless communication systems which overcome the inherent capacity, cell size, and other limitations of conventional cellular systems.

SUMMARY OF THE INVENTION

The present invention is a communication system having a plurality of forward channel communications and a plurality of corresponding reverse channel communications between a plurality of mobile users and a zone manager in an arbitrarily large broadcaster zone established by a broadcaster that is part of a zone manager. The users are located within the broadcaster zone. A plurality of collectors are distributed in proximity to the broadcaster zone at spaced-apart locations for receiving reverse channel signals from the users and forwarding the reverse channel signals to aggregators that are part of the zone manager. The zone manager operates to control the selection of users to form user groups and for selecting collectors to form collector groups.

The users and collectors are selected such that the difference between the propagation times from broadcaster to user to collector among users active with the same collector does not exceed a synchronization error such that user reverse channel signals at the collector are isolated from each other.

In one embodiment, the users are selected such that each of the users in the user group are located at a distance from each of said other users in the user group not greater than a distance $UR_{max}$. In a communication system having guard periods, $T_G$, between time slots for operating with a TDMA protocol where the guard periods establish a guard period distance, $D_G$, the distance $UR_{max}$ is, for example, approximately equal to one half the guard period distance $D_G$. Users in the user group located within a circle of radius $D_G/4$ satisfy the condition.

In another embodiment, the communication system selects collectors such that each of the collectors in a collector group is located at a distance from each of the other collectors in the collector group not greater than a distance $CR_{max}$ where $CR_{max}$ is a value such that user reverse channel signals at the collectors are isolated. For example, $CR_{max}$ is approximately equal to the guard period distance $D_G$. Collectors located within a circle of radius $D_G/2$ satisfy the condition.

In another embodiment, the aggregator combines the user reverse channel signals for each of the users from a plurality of collectors to form a combined signal where the combined signal for each of the users is isolated from the combined signal for each of the other users irrespective of whether or not the user reverse channel signals at the collectors are isolated.

In another embodiment, the communication system has long guard periods, $T_{LG}$, between time slots for operating with a TDMA protocol where the long guard periods establish a long guard period distance, $D_{LG}$, wherein unsynchronized users are recognized when the users are within a distance $D_{LG}$ of any collector irrespective of the distances of the unsynchronized users from the broadcaster. New users to be initially synchronized can be recognized at arbitrarily far distances from the broadcaster and hence the range of the communication system is arbitrarily large.

The foregoing and other objects, features and advantages of the invention will be apparent from the following detailed description in conjunction with the drawings.

DETAILED DESCRIPTION

Figure 1:
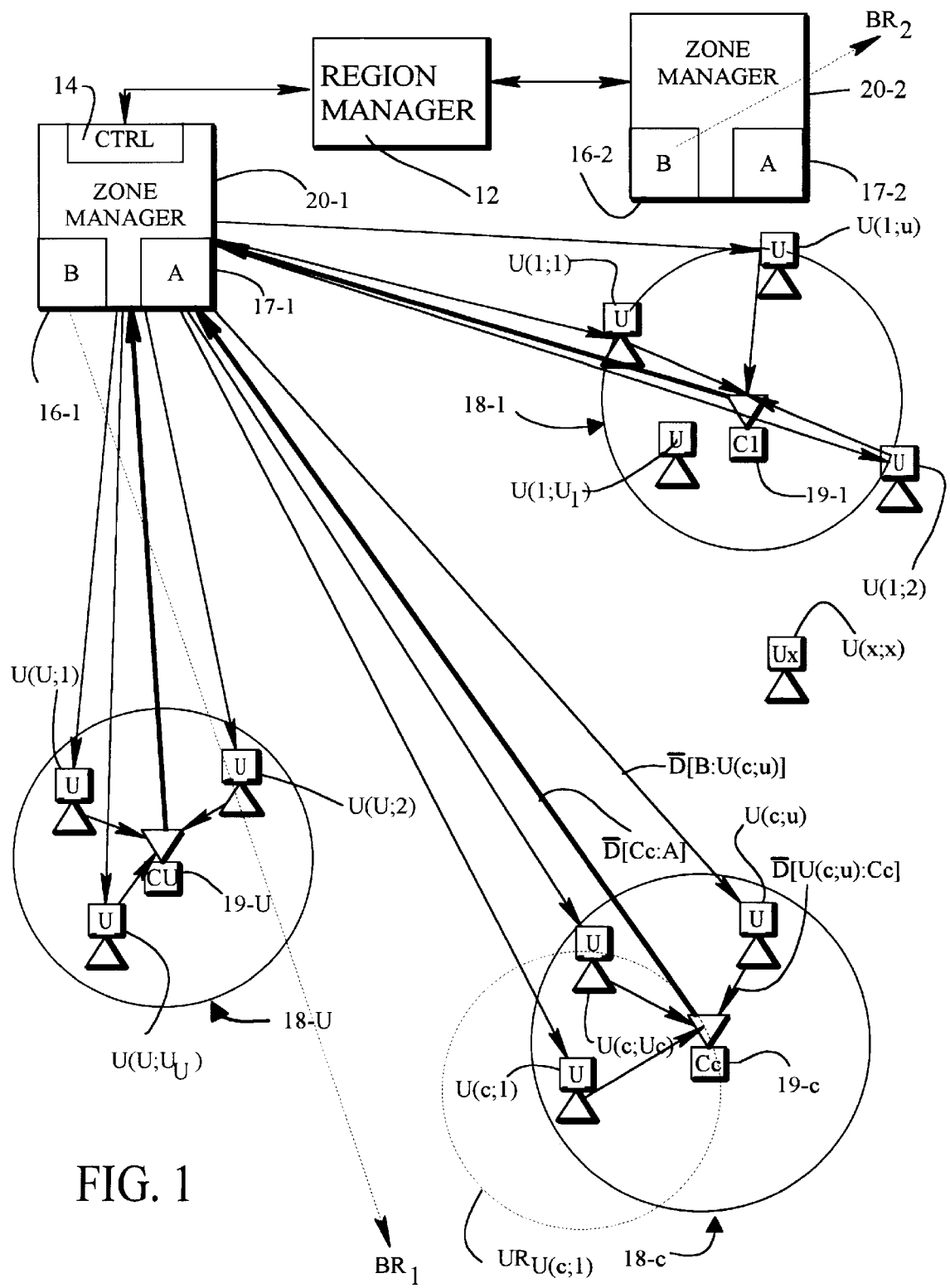
FIG. 1 depicts a multiple collector system for wireless users in broadcaster zones.

Zones With Multiple Collectors—FIG. 1

In FIG. 1, one zone manager (ZM) 20-1 includes a broadcaster (B) 16-1 that establishes a broadcast range, $BR_1$, for broadcasting forward channel transmissions to a plurality of users in a first zone defined by the range of $BR_1$. In a similar manner, one or more other zone managers, such as zone manager (ZM) 20-2 include a broadcaster (B), such as broadcaster 16-2 establishes a broadcast range, such as $BR_2$, for broadcasting forward channel transmissions to a plurality of users in a second zone defined by the range of $BR_2$. The zone managers 20-1 and 20-2 of FIG. 1 are controlled by a region manager 12. The details concerning the structure and operation of the region manager are described in the above-identified cross-referenced application.

In FIG. 1, the zone manager (ZM) 20-1 and broadcaster (B) 16-1 establish the broadcast range, $BR_1$, for broadcasting forward channel transmissions to a plurality of users in user groups 18-1, . . . , 18-c, . . . , 18-U that are within the broadcast zone. The user group 18-1 includes users designated U(1;1), U(1;2), . . . , U(1;$U_1$), the user group 18-c includes users designated U(c;1), . . . , U(c;u), . . . , U(c;$U_c$) and the user group 18-U includes users designated U(U;1), U(U;2), . . . , U(U;U$_U$)). Each of the users of user groups 18-1, . . . , 18-c, . . . 18-n (hereinafter sometimes referred to as users 18) has a receiver antenna for receiving broadcasts on the forward channel from the broadcaster 16-1 of zone manager 20-1. Also, each of the users 18 has a transmitter that transmits on the reverse channel establishing, for each user, a user range (UR) that in general covers a more limited area than that covered by the broadcaster range, BR. In FIG. 1, the user range, UR$_{U(c;1)}$, is shown for user U(c;1).

In one embodiment, the users of group 18-1 are located in close proximity to a C1 collector 19-1, the users of group 18-c are located in close proximity to a Cc colloetor 19-c, and the users of group 18-U are located in close proximity to a CU collector 19.-U The collectors 19-1, . . . , 19-c, . . . , 19-U (each generally identified as a collector 19) have receiver antennas for receiving transmissions from users 18. Each collector 19, in addition to receiving the reverse channel communications from users 18, also has forwarding means, such as a transmitter, for forwarding the reverse channel communications to an aggregator (A) 17-1 of the zone manager 20-1. While each of the collectors 19 in FIG. 1 have been described as single elements (collectors) sited at a single location, they also may be multiple elements (collectors) sited at different locations. The sites of collectors 19 may be within the range BR$_1$ or may be beyond the range BR$_1$ but within the range of users 18 that are in the range BR$_1$. In either case, the collectors 19 are in proximity to broadcasting zone established by BR$_1$.

Figure 2:
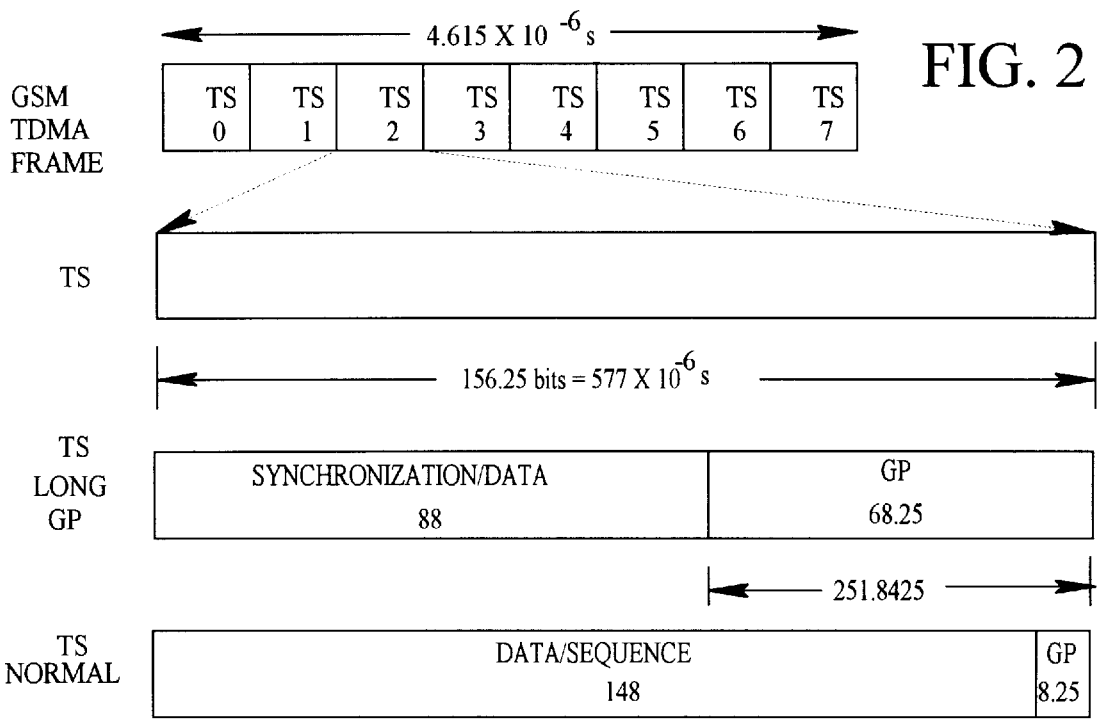
FIG. 2 depicts a representation of an eight slot TDMA frame of the type used in GSM systems.
Figure 3:
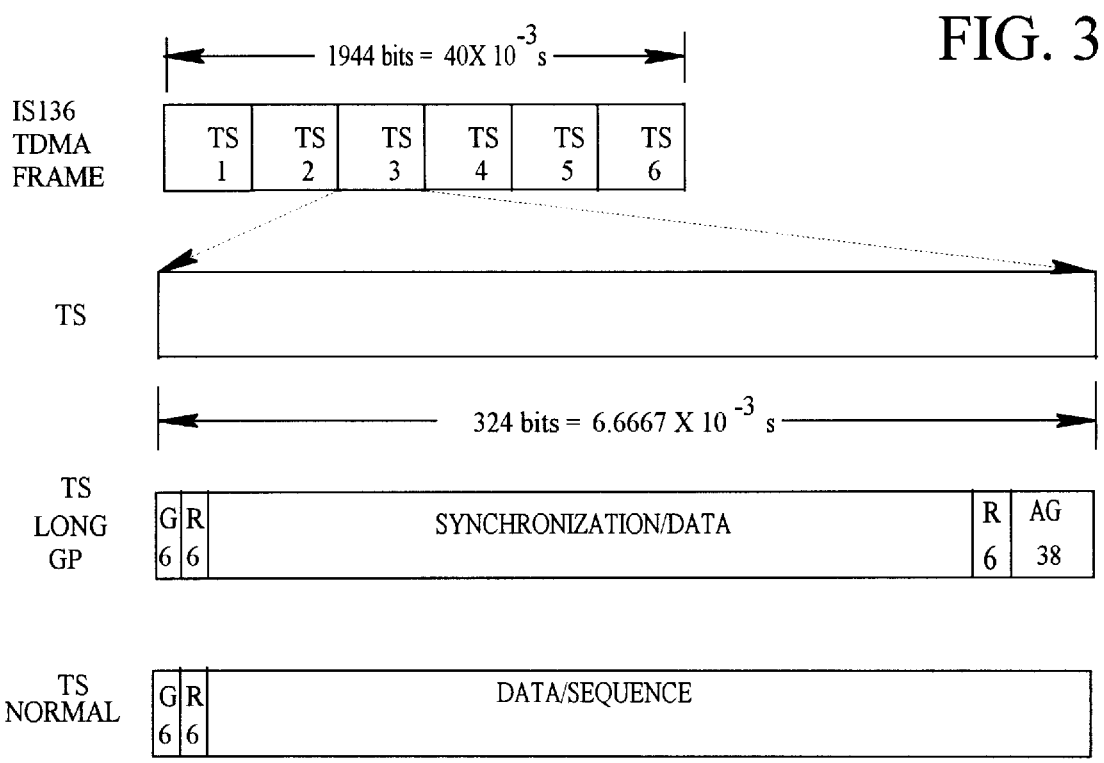
FIG. 3 depicts a representation of a six slot TDMA frame of the type used in IS136 systems.

The distances from the broadcaster 16-1 and the aggregator 17-1 to the collectors 19 may be arbitrarily large. In general, therefore, it can be assumed that any particular U(c;u) user in the group located near a particular Cc collector 19 may be at a sufficient range from the broadcaster 16-1 so as to violate in the absence of the present invention, the range limitations for synchronized base station-user communications established in the particular TDMA implementation in use. Examples of conventional TDMA timing are shown in FIG. 2 and FIG. 3. In connection with the present invention, the broadcaster 16-1 and the aggregator 17-1 may or may not be co-sited.

GSM and PCS1900 Frame Timing—FIG. 2

In FIG. 2, the TDMA frame timing for a GSM system is shown by way of example. The GSM frame includes time slots of different types including one with a long guard period T$_{LG}$ of 68.25 bits and one with a normal guard period T$_G$ of 8.25 bits. The time slot with a long guard period is used during synchronization transfers and the time slot with a normal guard period is used during normal information transfers.

IS136 Frame Timing—FIG. 3

In FIG. 3, the TDMA frame timing for a IS136 system is shown by way of example. The IS136 frame includes time slots of different types including one with a normal guard period T$_G$ having 6 guard (G) bits and 6 R bits and including one with a long "guard period" T$_{LG}$ of 6 G bits, 12 R bits, and 38 additional guard (AG) bits. The time slot with a long guard period is used during synchronization and the time slot with a normal guard period is used during normal information transfers.

Transmission Times—FIG. 1

In FIG. 1, a transmission time, T, from the broadcaster 16-1 of the zone manager 20-1 to any user 18 and from that user 18 back to the aggregator 17-1 of zone manager 20-1 is defined to be the sum of the forward channel radio wave travel time, T$_f$, and a reverse channel travel time, T$_r$. The transmission time for each user, such as a typical user, U(c;u), is a function of the distance, $\overline{D}$[B:U(c;u)], between the broadcaster 16-1 and the U(c;u) user 18, the distance, $\overline{D}$[U(c;u):Cc], from the U(c;u) user 18 to the collector 19-c, and distance $\overline{D}$[Cc:A] from the Cc collector 19 to the aggregator 17-1.

In FIG. 1, the distance, $\overline{D}$[B:U(c;u)], from the zone manager to a typical U(c;u) user 18 is variable since the users are mobile. Similarly, the distance, $\overline{D}$[U(c;u):Cc], from u(c;u) user 18 to the collector 19-c again is variable since the users are mobile. The distance $\overline{D}$[Cc:A] from the Cc collector 19 to the aggregator 17-1 is generally known since the collectors are generally stationary.

For ease of exposition in the following description, the propagation times are considered to be the minimum possible, that is, those due to straight-line propagation between transmitter and receiver, even in cases where no direct line of sight is available. In practice, multipath signals exist and must be considered. The least-delayed signal is the first to arrive at the reception point. Signals with larger delays arrive after the first-to-arrive signal and continue to arrive over some time delay spread.

In the forward channel, the forward channel travel time, T$_f$, for each user 18, such as a particular U(c;u) user 18 of user group 18-c, is given by:

$$T_f(B:U(c;u)) = (\overline{D}[B:U(c;u)])/v \qquad \text{Eq. (1)}$$

where:

($\overline{D}$[B:U(c;u)])=distance from B broadcaster 16 to U(c;u) user 18 v=speed of light in the atmosphere

In the reverse channel, the reverse channel travel time, T$_r$, from the particular Cc collector 19 within the user range of the U(c;u) user 18 is as follows:

$$T_r = T_r(U(c;u):Cc) + T_r(Cc:A) \qquad \text{Eq. (2)}$$

where,

T$_r$(U(c;u):Cc) = $\overline{D}$[U(c;u):Cc]/v

T$_r$(Cc:A) = $\overline{D}$[Cc:A]/v and where, $\overline{D}$[U(c;u):Cc]=the variable distance from the particular U(c;u) user 18 to the particular Cc collector 19

$\overline{D}$[Cc:A]=the fixed distance from the Cc collector 19 to the A aggregator 17.

v=speed of light in the atmosphere

The zone manager 20-1 establishes a time base TB$_B$ for the (B) broadcaster 16-1 and a time base TB$_A$ for the (A) aggregator 17-1. The time base TB$_B$ is typically used as the reference time base. The time bases for all other system components are referenced to the reference time base. For any component in a TDMA system, the time base marks the periodically recurring times at which time slots begin for that component.

Assuming that the zone manager broadcaster time base, TB$_B$, is the reference, the time base, TB$_{Cc}$, of the collector Cc is given as follows:

$$TB_{Cc} = TB_B + \Delta_{Cc} \qquad \text{Eq. (3)}$$

where $\Delta_{Cc}$=time base adjustment for the particular Cc collector 19.

Each particular U(c;u) user 18 has a time base TB$_{U(c;u)}$ which must be adjusted at least once during the duration of a connection to maintain system synchronization. The (B) broadcaster 16-1 periodically sends a burst of control data used for this purpose. When a particular U(c;u) user 18 receives this control burst, it uses the time of arrival of the burst to establish an initial time base $TB_{U(c;u)}$ relative to the broadcaster 16-1. This time base then lags the $TB_B$ broadcaster time base by an amount of time equal to the forward path propagation time from the broadcaster 16 to the user 18, $T_f(B:U(c;u))$. Comparing the time bases for the users 18 and the collectors 19, this requirement can be expressed for any particular U(c;u) user 18 in the user group of any particular Cc collector 19-c as follows:

$$TB_{U(c;u)0} = TB_B + T_f(B:U(c;u)) \qquad \text{Eq. (4)}$$

The U(c;u) user 18 user sends a reply synchronization burst which arrives at the Cc collector 19-c delayed by the user-collector travel time, $T_r(U(c;u):Cc)$. To avoid interference with other time slots on the carrier, these bursts from the user should arrive no later than the long guard period $T_{LG}$ of the particular TDMA implementation in use, relative to the time base $TB_{Cc}$ of the Cc collector. This relationship may be summarized as:

$$T_f(B:U(c;u)) + T_r(U(c;u):Cc) - \Delta_{Cc} < T_{LG} \qquad \text{Eq. (5)}$$

Once the Cc collector 19 receives a synchronization burst from a U(c;u) user 18, the signal is returned to the aggregator 17-1.

Under one embodiment of the present invention, the Cc collector 19 delays the return so that the signal arrives at the (A) aggregator 17-1 offset from the aggregator time base $TB_A$ by the same amount as at each Cc collector 19. Alternatively, the aggregator 17-1 adjusts the individual collector Cc returns to account for each collector-to-aggregator delay. The zone manager 20-1 processes the synchronization messages and determines the location of each particular U(c;u) user 18 and the expected travel times $T_f(B:U(c;u))$ and $T_r(U(c;u):Cc)$. Using this information, the zone manager 20-1 sets the time advancement, $\Delta_{U(c;u)}$ to synchronize the particular U(c;u) user 18 to the particular Cc collector 19-c as follows:

$$\Delta_{U(c;u)} = \Delta_{Cc} - T_f(B:U(c;u)) - T_r(U(c;u):Cc) \qquad \text{Eq. (6)}$$

In Eq. (6), a positive value for $\Delta_{U(c;u)}$ indicates time advancement, whereas a negative value implies time delay at the user. The modified time base for the U(c;u) user 18 is then as follows:

$$TB_{U(c;u)} = TB_B + T_f(B:U(c;u)) - \Delta_{U(c;u)} = TB_B + T_r(U(c;u):Cc) - \Delta_{Cc} \quad \text{Eq. (7)}$$

Eqs. (5) and (7) demonstrate the capability of the present invention to arbitrarily extend the range of TDMA cellular systems. Conventional cellular architectures cannot synchronize (without loss of capacity) users with ranges that give round trip transmission times greater than the long guard period ($T_{LG}$). By siting a collector with an independent time base in a region remote from the broadcaster, the present invention allows for coverage at arbitrary ranges from the broadcaster with no loss of capacity.

FIG. 1, in one example, is an embodiment where groups of users are synchronized to a single collector. When more than one collector is used for a group of users, the optimal choice of user time advancement or delay when more than one collector is within user range is more complicated and will be described below. Also, users are generally mobile, and thus user location and the various radio signal travel times between system components change in time. The synchronization process, therefore, is repeated as needed based on criteria determined by the zone manager 20-1 or region manager 12, or may be routinely performed at times set by a system operator with regard to the expected velocities for users.

The user groups in FIG. 1 operate with a TDMA protocol where the users 18 are assigned time slots (TS) within a common frequency band. Groups of time slots, called frames, are repeated, but each of the users' time slots remain the same from frame to frame. Each user operates in a bursting mode with its transmitter on to transmit only in its assigned time slot for each frame and with its transmitter off for the remaining time slots of the frame.

Arbitrarily Distant User Synchronization—FIG. 1

The range limitations of present TDMA applications have been shown to depend on the maximum difference in travel times between a user located arbitrarily close to a base station and a user located far from the base station. This maximum synchronization radius, $R_{synch-max}$, was shown to equal $D_{LG}/2$.

Under one embodiment of the present invention, the time base of a remotely-sited collector, such as the Cc collector 19-c in FIG. 1, is adjusted to account for the one-way travel time from the broadcaster 16-1 to the Cc collector. Then, the synchronization bursts from the users U(c;1), . . . U(c,u), . . . U(c;Uc) located within the distance $D_{LG}$ of the Cc collector will arrive at the Cc collector 19-c within the allowed guard period. Once the collector returns these signals to the (A) aggregator 17-1, over the known fixed distance, and therefore delay, between the Cc collector 19-c and the (A) aggregator 17-1, the control software code of the zone and region managers operates to recognize the synchronization requests from the users. This embodiment of the present invention allows for users to be located arbitrarily far from the broadcaster within the established broadcaster range. For example, a user U(x;x) traveling outside the broadcast zone at a distance that is much greater than the distance $D_{LG}$, will not be recognized. When the user travels to be within $D_{LG}$ of any collector, for example, collector C1, the U(x;x) user will be recognized. After the user has been recognized, the zone manager 20-1, or the region manager 12, assigns the user to the user group 18-1 and sets the user time base.

Figure 4:
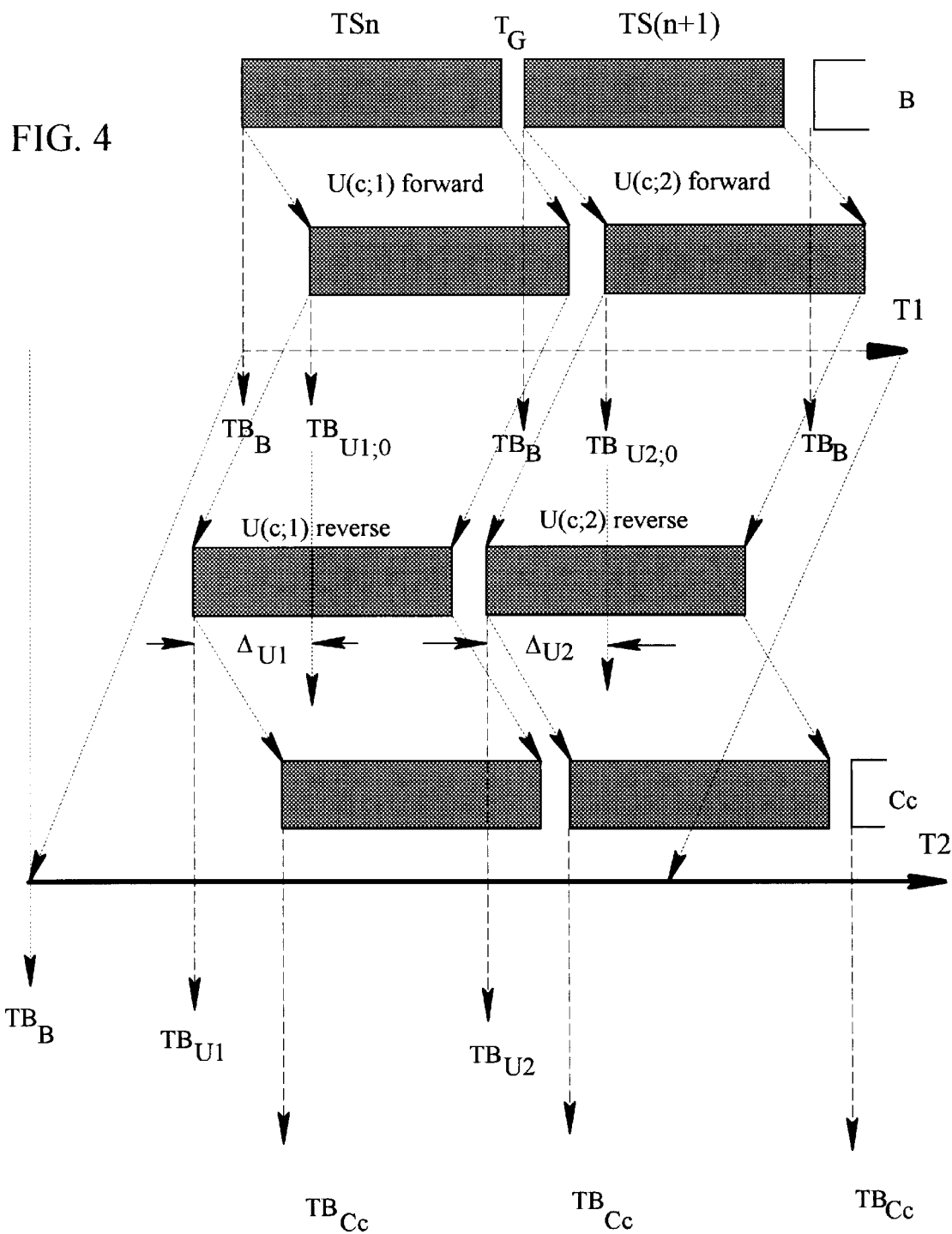
FIG. 4 depicts a representation of two sequential TDMA time slots for two users.

Multiple User, Single Collector Timing—FIGS. 1 And 4

FIG. 4 depicts the broadcaster to user to collector communications links for normal communications traffic after synchronization is established for multiple users being received by a single collector on the same carrier. In FIG. 4, the time slots TSn and TS(n+1) are part of the frame structure for a carrier transmitted by the B broadcaster 16-1 of FIG. 1 for normal traffic forward channel communications with the user group associated with the Cc collector 19-c of FIG. 1. For purposes of explanation and referring to FIG. 1, time slot TSn and its homologous slots in the frame structure are assigned for communications with user U(c;1), and time slot TS(n+1) and its homologous slots in the frame structure are assigned for communications with user U(c;2).

Digital TDMA standards have implemented time offsets between forward and reverse channel communications. The time offset is designed to allow the user communications equipment to process incoming communications and outgoing communications sequentially, rather than simultaneously. For GSM systems, this offset is equal to three time slot periods. For IS136 systems, the offset is one time slot period plus 88 bits. For ease of exposition, in FIG. 4 this offset is not shown explicitly. The time line T1 refers to forward channel communications for those portions of FIG. 4 above the T1 time line. The time line T2 refers to reverse channel communications at times offset from the T1 time line by some implementation-dependent time offset, and applies to those portions of FIG. 4 between timelines T1 and T2. FIG. 4, without loss of generality, depicts a TDMA implementation for which the timing offset between forward and reverse communications is an integer multiple of the time slot period. Thus the time bases $TB_{U1;0}$ and $TB_{U2;0}$, the adjusted time bases $TB_{U1}$ and $TB_{U2}$, and the user synchronization timing offsets $\Delta U1$ and $\Delta U2$ are shown.

The users $U(c;1)$ and $U(c;2)$ receive the forward channel transmission from the broadcaster 16-1 at times that are shifted relative to the time base $TB_B$ of the broadcaster by the propagation times $T_f(B:U(c;1))$ and $T_f(B:U(c;2))$. Since the users are in general mobile and are in general not located at the same distance from the broadcaster, the time shifts or skews are not in general the same.

Each of the users transmits a reverse channel transmission in its respective time slot on the paired reverse communications carrier frequency to the Cc collector. These transmissions are received at times that are shifted relative to the time bases $TB_{U(c;1)}$ and $TB_{U(c;2)}$ by the propagation times $T_r(U(c;1):Cc)$ and $T_r(U(c;2):Cc)$, these times in general being unequal. In order that the transmitted burst from user $U(c;1)$ not interfere with the transmitted burst from user $U(c;2)$, the time bases of each user are adjusted by timing advances $\Delta U(c;1)$ and $\Delta U(c;2)$, abbreviated $\Delta U1$ and $\Delta U2$, respectively. As depicted in FIG. 4, this adjustment ensures that each burst arrives properly positioned at the commencement of its assigned time slot at the Cc collector 19. All of the pertinent timing variables for the evaluation of Eqs. (6) and (7) for both users are indicated in FIG. 4.

The defined guard period $T_G$ separates the user bursts at the broadcaster, and serves as the allowed margin for error at the collector. If timing mismatch, malfunction, or excessive delay spreading occurs, the guard period will ensure that communications are not disrupted.

The $U(c;u)$ users 18 are in general mobile, and thus the synchronization procedure must be periodically updated to reflect the changing locations, and thus the changing propagation times from the $U(c;u)$ users 18 to the B broadcaster 16-1 and the Cc collector.

Figure 5:
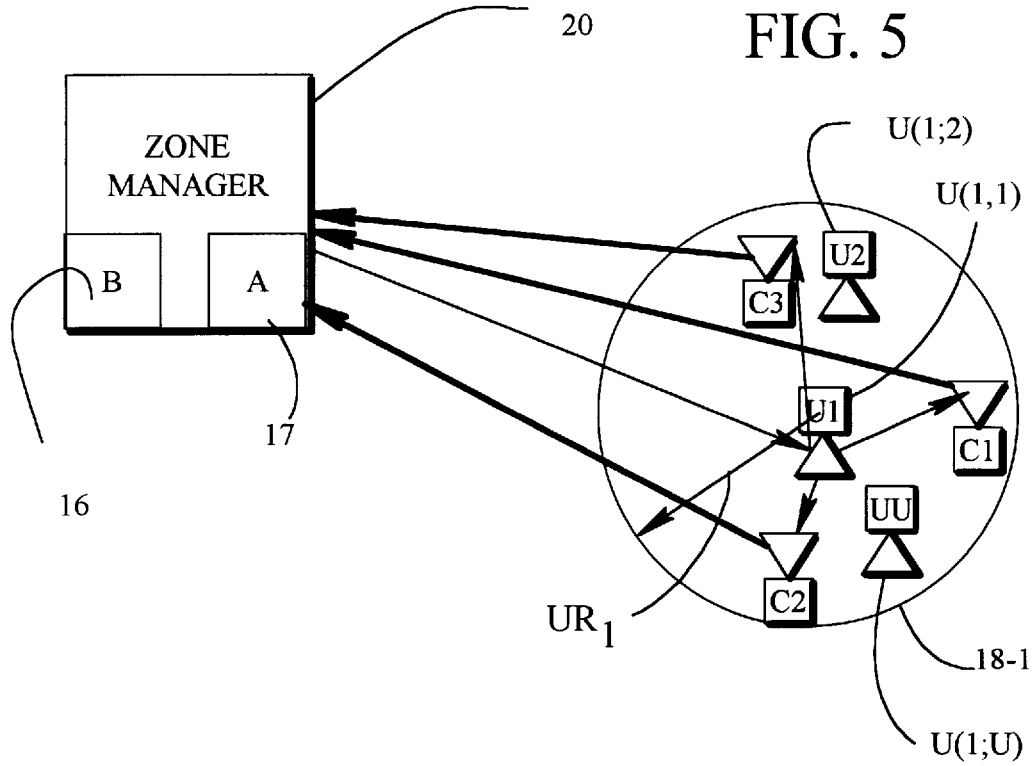
FIG. 5 depicts a user group from the FIG. 1 system which has signals from each single user transmitted to multiple collectors of a collector array.

Single User at Multiple Collectors—FIG. 5

Once synchronization of any user 18, for example user U1, to a C1 collector is established, then that user U1 may be synchronized to other collectors, such as collectors C2 and C3, as depicted in FIG. 5. This operation fixes the user time base correction, $\Delta_{U1}$, given an arbitrarily chosen C1 collector 19 time base $TB_{C1}$.

The user transmission power establishes a user range UR1, indicated in FIG. 5, over which received signal strengths at collectors are at power levels sufficiently above the ambient noise floor to be useable, an implementation-dependent requirement. Transmissions from the U1 user 18 will in general arrive at various times relative to the time base of each other Cc collector 19 in the user range $UR_1$, for example C2 and C3. To ensure that the transmissions arrive at the start of an assigned time slot for each of these, the time bases $TB_{Cc}$ of the other Cc collectors 19 must be adjusted to reflect the various propagation times $T_r(U1:Cc)$ from the U1 user 18 to each of them.

If the other Cc collectors have previously been synchronized to other users, for example U2 and UU transmitting on the particular carrier assigned for communications to the U1 user, this synchronization would have to be updated by changing the time bases of any other users 18 transmitting to any other Cc collectors. If in turn any of the other users 18 are within range of the C2 collector, the overall synchronization becomes a complex process for which several embodiments of operating procedures are described below.

If overall synchronization is not efficiently accomplished, the total system capacity will be reduced. Unsynchronized communications are in general possible only if time slots within the TDMA frame structure on each carrier are skipped to avoid burst-to-burst interference between signals from different mobile users. The operating procedures described below retain the theoretical full capacity of the cellular system and do not require that time slots be skipped.

Figure 6:
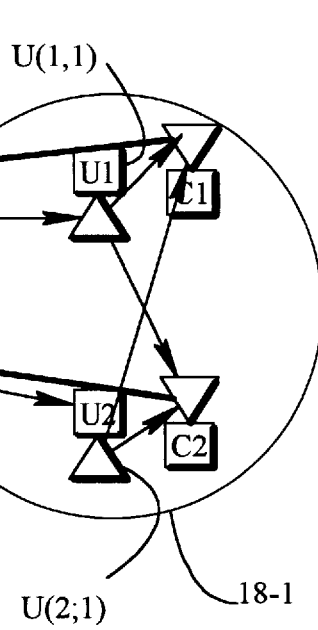
FIG. 6 depicts one of the user groups of the FIG. 1 system with two collectors and two users.

Multiple Users at Multiple Collectors—FIG. 6

The timing requirements summarized in Eqs. (6) and (7) for a single user at a single collector are met in the specific cases of multiple users at one collector and of one user at multiple collectors. These requirements cannot be satisfied in general for multiple users at multiple collectors. The difficulty is depicted in FIG. 6 for the case of two users transmitting to two collectors 19 on the same carrier. Since $TB_B$ is the same for all users and collectors, Eq. (6) can be applied to set the two user timing advances $\Delta_{U(1;1)}$ and $\Delta_{U(2;1)}$ as follows:

$$\Delta_{U(1;1)}=\Delta_{C1}-T_f(B:U(1;1))-T_r(U(1;1):C1) \qquad 8(a)$$

$$\Delta_{U(2;1)}=\Delta_{C2}-T_f(B:U(2;1))-T_r(U(2;1):C2) \qquad 8(b)$$

Eq. (8)

for each user considered as a single user at its nearest collector. These equations are independent and solvable. However, for cross-synchronization, Eq. (6) may also be applied as follows:

$$\Delta_{U(1;1)}=\Delta_{C2}-T_f(B:U(1;1))-Tr(U(1;1):C2) \qquad 9(a)$$

$$\Delta_{U(2;1)}=\Delta_{C1}-T_f(B:U(2;1))-Tr(U(2;1):C1) \qquad 9(b)$$

Eq. (9)

While Eq. 9(a) and Eq. 9(b) are also independent of each other, the set of equations Eq. (8) and Eq. (9) are not independent. Comparing the right hand side (RHS) of Eq. 8(a) and Eq. 9(a), and Eq. 8(b) and Eq. 9(b), it can be seen that the coupled equation set reduces to the following:

$$\Delta_{C1}-T_r(U(1;1):C1)=\Delta_{C2}-T_r(U(1;1):C2) \qquad 10(a)$$

$$\Delta_{C2}-T_r(U(2;1):C2)=\Delta_{C1}-T_r(U(2;1):C1) \qquad 10(b)$$

Eq.(10)

which is solvable only if $$T_r(U(1;1):C2)-T_r(U(2;1):C2)=T_r(U(1;1):C1)-T_r(U(2;1):C1) \qquad \text{Eq. (11)}$$

Eq. (11) indicates that perfect simultaneous synchronization for two users at two collectors may only be achieved when the difference in propagation times from each user to the first collector equals the difference in propagation time from each user to the second collector. While Eq. (11) is solved by particular values of the various user-to-collector reverse transmission times $T_r$, it is not solved in general. Since users may be mobile and the values of $T_r$ will change, the two users cannot always be maintained in perfect synchronization at the two collectors.

The guard period $T_G$ is used to compensate for imperfect synchronization. Without loss of generality, consider TDMA systems where the guard period is specified to be at the end of a burst. The forgoing argument would be similarly constructed if the guard period were set at the beginning of each burst, or divided in some manner between the beginning and the end. The synchronization error $SE(U(c;u):Cc)$, for any $U(c;u)$ user 18 and any Cc collector 19, is the difference between the time of arrival of user bursts at the collector and the collector time base $TB_{Cc}$, which is when the collector expects the burst to arrive. A burst may arrive as late as the guard period $T_G$ and still be completed within its allocated time slot. That is, burst isolation is achieved when the following expression is satisfied:

$$SE(U(c;u):Cc) < T_G \qquad \text{Eq. (12)}$$

The synchronization error is thus constrained by the guard period $T_G$. The maximum timing mismatch may either be expressed in units of time as $T_G$, or in units of distance as $D_G$.

Now reconsider the case of two users at two collectors depicted in FIG. 6 and described in Eqs. (8–11). Each user may be perfectly synchronized to the collector nearest it, as described in Eq. (8). This implies $SE(U(1;1):C1)=SE(U(2;1):C2)=0$. Examination of Eqs. (8–11) then reveals the synchronization conditions $$SE(U(1;1);C2)=T_r(U(1;1):C2)-T_r(U(1;1):C1) < T_G \qquad \text{13(a)}$$

$$SE(U(2;1);C1)=T_r(U(2;1):C1)-T_r(U(2;1):C2) < T_G \qquad \text{13(b)}$$

Eq. (13)

Transmission from the two users will be contained within their assigned time slots at both collectors if Eq. 13(a) and Eq. 13(b) are satisfied. In the general case of multiple users at multiple collectors, an array of synchronization conditions like Eq. (13) is generated.

Figure 7:
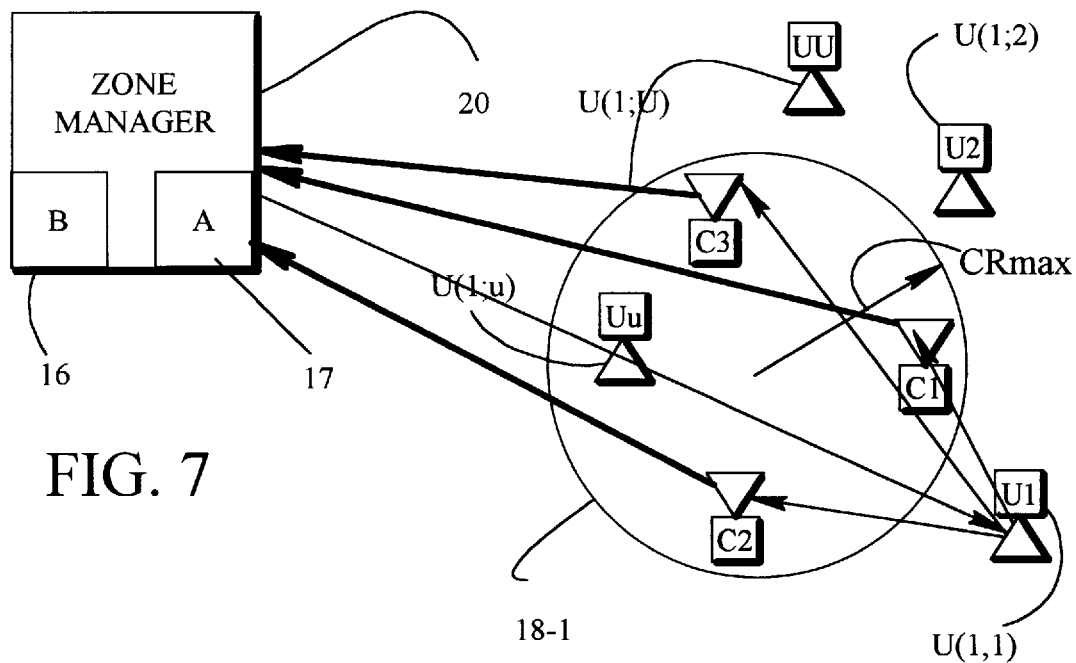
FIG. 7 depicts an embodiment of the FIG. 1 system in which collectors in a collector array are located within $CR_{max}$ of each other.
Figure 8:
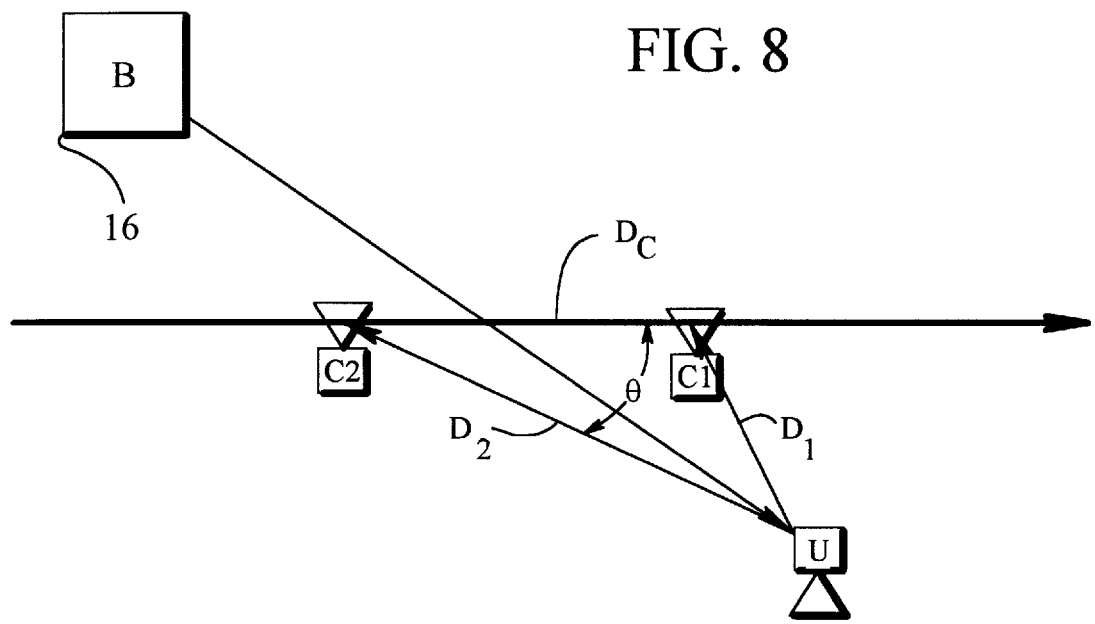
FIG. 8 depicts a representation of the distances of the signal paths of the FIG. 7 embodiment.

Collector Group Operations—FIGS. 7 and 8

One way to satisfy the synchronization requirements for multiple users and multiple collectors is to group the collectors which receive user transmissions on a particular carrier. This grouping of collectors is depicted in FIG. 7. If a user, for example U1, is synchronized at one of the collectors, for example C1, in the group, then the synchronization error at any other collector, for example C2 or C3, in the collector group is small. In general users may be located in any direction from the group of collectors. The distances from users to the collectors of the group, the distribution of users, and the distribution of collectors within the group are arbitrary and have been depicted by way of a simple example in FIG. 7 without intended loss of generality.

In FIG. 7, assume all the Cc collectors C1, C2, and C3 in the collector group share a common time base, $TB_{CG}$. This time base is used to synchronize all of the users $U(1,1)$, $U(1,2), \ldots, U(1,u), \ldots, U(1,U)$ assigned to time slots on the carriers received by the collector group of FIG. 7. Synchronization is applied by perfectly synchronizing any particular user such as user U1 to the particular collector C1 within the group that is located nearest to that particular user.

This synchronization is depicted in FIG. 8, where the closest collector to the U1 user is collector C1. Then, any user U (corresponding, for example, to User U1 in FIG. 7) synchronization error to every other collector Cc in the group, C2 and C3 in the example of FIG. 7, is computed based on the differences in the propagation times $T_r(U:Cc)$ for all other collectors Cc in the collector group. In FIG. 8, collector C2 is selected as some typical one of the other collectors in the collector group. If some ones of the other collectors in the collector group are too distant from the particular collector, then the particular user will not satisfy the synchronization requirements for those ones of the other collectors.

In FIG. 8, the distances $D(U:C1)$ and $D(U:C2)$ are abbreviated as $D_1$ and $D_2$, and the separation between the collectors C1 and C2 is abbreviated as $D_C$. Algebraically, the synchronization requirement is stated as follows:

$$SE(U:C2)=T_r(U:C2)-T_r(U:C1)=(1/v)[D_2-D_1] < T_G \qquad \text{Eq. (14)}$$

or $$D_2-D_1 < vT_G=D_G \qquad \text{Eq. (15)}$$

where v is the speed of light. Referring to FIG. 8, the separation $D_C$ may be expressed in terms of $D_1$ and $D_2$ as $$D_C = D_2\cos(\theta) - \sqrt{D_1^2 - D_2^2\sin^2(\theta)} \qquad \text{Eq. (16)}$$

which is maximized for $\theta=0$ as $D_2-D_1$. Thus, the synchronization condition for synchronization based on collector groups is that no two collectors in the collector group may be farther apart from one another than a distance $CR_{max}$, where for example, $CR_{max}$ equals the distance $vT_G$, which is designated as $D_G$, the guard distance. If all pairs of collectors within the collector group satisfy this pairwise condition, then synchronized TDMA communications at full capacity are possible in accord with the present invention with any arbitrary range (limited in principle only by the broadcaster broadcast range). Under one embodiment of the present invention, this collector location requirement is satisfied by requiring that all collectors be sited within a circle of radius $D_G/2$.

Figure 9:
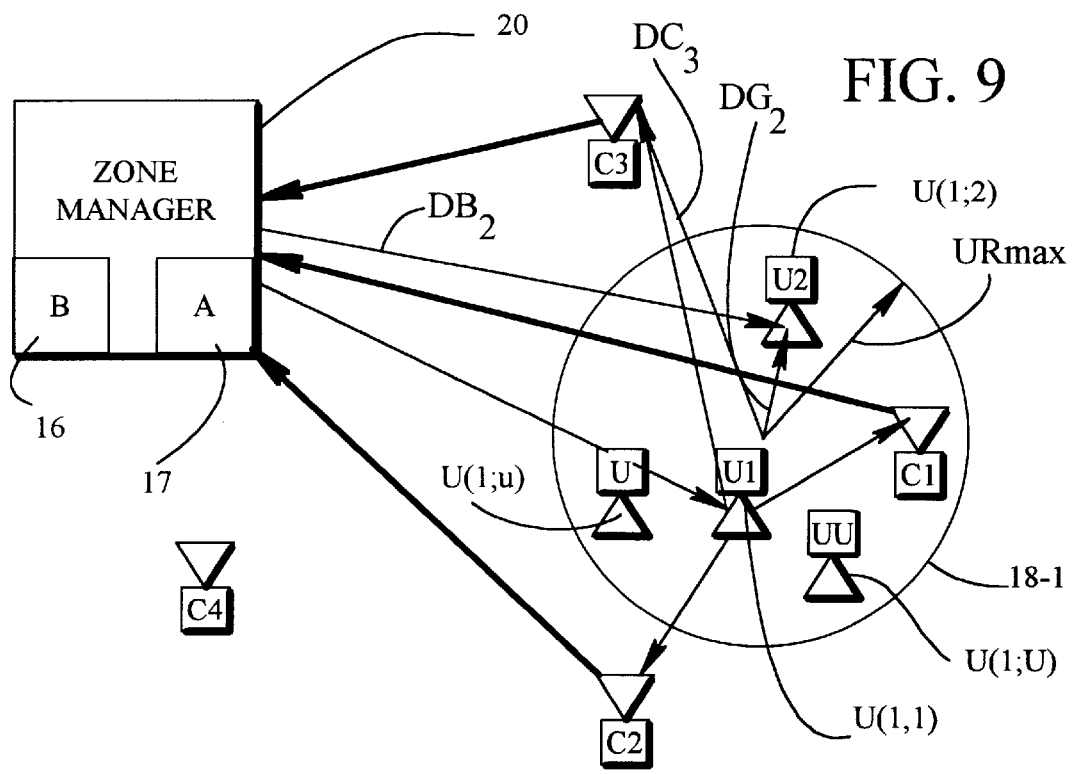
FIG. 9 depicts an embodiment of the FIG. 1 system in which users located within $UR_{max}$ of each other form a user group.
Figure 10:
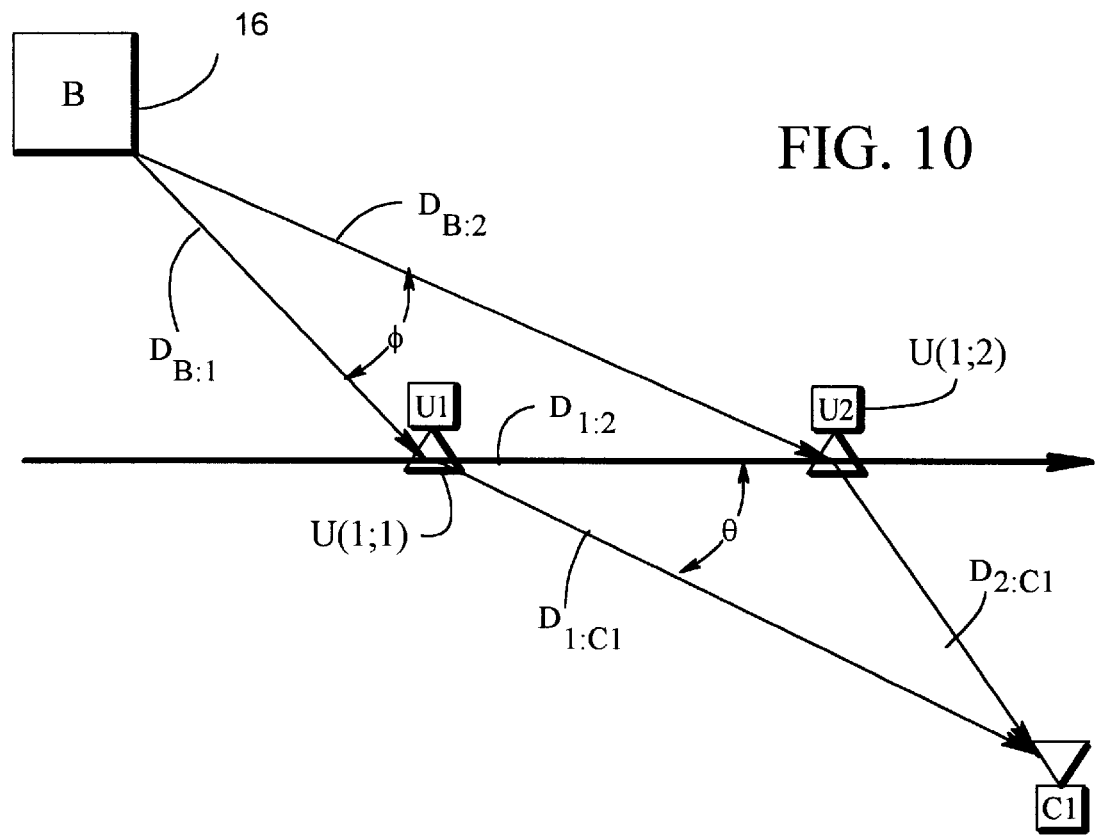
FIG. 10 depicts a representation of the distances of the signal paths of the FIG. 9 embodiment.

User Group Operations—FIGS. 9 and 10

In FIG. 9, a second technique for meeting the synchronization requirements is achieved by grouping the users $U(1,1), U(1,2), \ldots, U(1,u), \ldots, U(1,U)$ which will be assigned to time slots on a particular carrier. The time bases of all collectors, for example collector C1 in FIG. 9, assigned to receive that carrier are adjusted so that bursts from any particular user in the user group are received in perfect synchronization, then bursts received from other users in the user group will be nearly synchronized. This grouping of users is a more dynamic operating scenario, because in general the users are mobile. In the previous case of collector groupings as described in connection with FIGS. 7 and 8, the collectors are generally fixed in location. Thus a collector group, once defined, remains intact. User groups, in contrast, will be formed as users move close enough together such that synchronized communications become possible.

User Group Operations

The zone manager (ZM) of FIG. 1 performs real-time synchronization and control of the user groups using the zone database of TABLE 1.

TABLE 1

Zone Database
COPYRIGHT © 1996 Cellular Telecom, Ltd.

| | |
|---|---|
| DSynch | Maximum allowed distance for user from user group center |
| NColl2Use | Number of collectors to assign to each user group |
| LightSpeed | Speed of light in atmosphere |
| NRegUsers | Number of registered users in zone |
| NColls | Number of collectors in zone |
| NGroups | Number of groups currently assigned to zone |
| UserStatus(NRegUsers,8) | |
| For each registered user, 8 fields: | |
| (1) 0/1 | Inactive/Active |
| (2) I | If active, assigned to I-th group |
| (3) J | If active, assigned to J-th logical slot of group |
| (4) −1,X | X-location if known |

TABLE 1-continued

Zone Database
COPYRIGHT © 1996 Cellular Telecom, Ltd.

```
    (5) -1,Y        Y-location if known
    (6) -1,DG       Distance from group center
    (7) -1,DB       Distance from broadcaster
    (8) T           Timing advance
BroadLoc(2)
    (1)             X-location of broadcaster
    (2)             Y-location of broadcaster
CollLoc(NColls,2)
    For each collector, 2 fields:
    (1)             X-location
    (2)             Y-location
CollStatus(NColls,NGroups)
    (1) 0/1         1 if collector is assigned to group
GroupStatus(NGroups,7)
    For each group currently assigned to zone, 7 fields:
    (1) F           Carrier frequency
    (2) 0/1         Down or up (not in use/in use)
    (3) N           Maximum number of slots available in group
    (4) 0/M         Full/Open (All slots used/M slots empty)
    (5) X           X-location of group center
    (6) Y           Y-location of group center
    (7) n           Number of collectors assigned to group
GroupSlots(NGroups,MAXSlots,3)
    For each group, for each available logical slot, 3 fields:
    (1) K           K-th physical slot on carrier
    (2) 0/1         Empty/filled
    (3) 0,I         If filled, assigned to I-th registered user
GroupColls(NGroups,MAXColls,2)
    For each group, for each collector assigned to group, 2 fields:
    (1) L           the collector identifier
    (2) D           Distance from L-th collector to group center
```

The zone database of TABLE 1 applies, for example, to the figures and description of the application as follows.

In FIG. 9, as an example, for the ordered pair (User Group (1, 4), User Group (1,5)), DSynch is the center location for all of the users U1, U2, . . . , UU and all of the users are located within the circle 18-1 having radius $UR_{max}$=DSynch.

In FIG. 9, the number of collectors, NColl2Use, assigned to the user group 18-1 is 3 corresponding to the collectors C1, C2 and C3.

In FIG. 9, the number of registered users, NRegUsers, is UU and includes the users U1, U2, . . . , UU where the number UU may be any integer number such as 10, 100 or larger.

In the FIG. 9, only one zone is shown and the number of total collectors, NColls, is equal to 4 and includes the collectors C1, C2, C3 and C4.

In FIG. 9, the number of user groups, NGroups, is 1 for simplicity of explanation. By way of comparison, in FIG. 1, the number of user groups for zone 1 is U corresponding to groups 18-1, . . . , 18-c, . . . , 18-U.

In TABLE 1, the UserStatus for each registered user is contained in eight fields. The first field in Inactive/Active field to establish whether or not the user is active or inactive. The second field is the group number. For example, in FIG. 1, one of the groups 18-1, . . . , 18-c, . . . , 18-U is identified in the second field. The third field establishes the logical time slot for the group. For a TDMA system having eight time slots, the logical slots from frame to frame are ordered L1, L5, L2, L6, L3, L7, L4, L8. The physical time slots, referring for example to FIG. 2, are ordered TS0, TS1, TS2, TS3, TS4, TS5, TS6, TS7. In TABLE 1, the fourth and fifth fields identify the X-location and the Y-location of the user. Field 6 identifies the user distance from the group center which by way of example for U2 is $DG_2$ in FIG. 9. Field 7 represents the user distance from the broadcaster which is shown as $DB_2$ in FIG. 9 for user U2. Field 8 indicates the amount of the timing advance of the user's reverse channel broadcast to the collectors.

In TABLE 1, the BroadLoc entry identifies the location of the broadcaster.

In TABLE 1, the CollLoc entry for each collector identifies the location for each collector.

In TABLE 1, the CollStatus entry indicates the status of each collector for each of the NGroups.

In TABLE 1, the Group Status entry indicates for each group the carrier frequency, the in-use state, the maximum number of slots available in the group, whether or not all slots are in use, the location of the group center, and the number of collectors assigned to the group.

In TABLE 1, the GroupSlots entry identifies the availability of logical slots and the correspondence between the logical slots and the physical slots.

In TABLE 1, the GroupColls entry indicates for each group the collectors that are assigned to the group using the collector's identifier and the distance that the particular collector is from the group center. In FIG. 9, the distance $D_{C3}$ for collector C3 from the center to collector C3 is shown.

Control code for controlling various operations in the present invention is listed in TABLE 2. The control code is executed, for example, in the control means 14 of zone manager 20-1 of FIG. 1. Zone manager 20-1 is typical of all the zone managers. Further details of the zone manager 20-1 including the control means 12 are shown and described in the above-identified cross-referenced application.

The control code of TABLE 2 uses the database of TABLE 1 to perform a number of control functions including adding a new user to an existing user group, deleting a user from an existing user group, creating a new user group, and updating the synchronization of an existing user group. With these and other operations, the zone manager through the control means 14 selects ones of the plurality of users to form a user group (in FIG. 7, for example, users U1, U2, . . . , Uu, . . . , UU) and selects ones of the plurality of collectors (in FIG. 7, for example, collectors C1, C2, and C3) to form a collector group.

The control code of TABLE 2 uses the database of TABLE 1 for selecting ones of a plurality of users that are located within a distance of at least one of the collectors such that the synchronization error for each of the users is less than a predetermined value. For example, where the communication system has long guard periods, $T_{LG}$, between time slots for operating with a TDMA protocol, the long guard periods establish a long guard period distances, $D_{LG}$. Unsynchronized ones of the users are synchronized in the broadcaster zone when the unsynchronized users are within a distance $D_{LG}$ of any collector such that the synchronization error for each of the users is less than a predetermined value.

The control code of TABLE 2 operates in accordance with the description of FIG. 7 and selects ones of the collectors such that each of the collectors in the collector group is located at a distance from each of the other collectors in the collector group not greater than the distance $CR_{max}$ where $CR_{max}$ is a value such that user reverse channel signals at the collectors are isolated.

The control code of TABLE 2 operates in accordance with the description of FIG. 9 and selects ones of the plurality of users such that each of the users in a user group is located at a distance from each of the other users in the user group not greater than a distance $UR_{max}$ where $UR_{max}$ is a value such that user reverse channel signals at the collector are isolated.

TABLE 2

Control Code For User Group Operations.
COPYRIGHT © 1996 Cellular Telecom, Ltd.

```
function status = AddUser( User)
if (UserStatus(User,4) = = -1 )
    status = -9;
    return;
end;
userX = UserStatus(User,4);
userY = UserStatus(User,5);
oldGroup = 0;
if ( UserStatus(User,l)= =1 )
    oldGroup = UserStatus(User,2);
end;
nOff = 0;
nOpen = 0;
for group = 1:Ngroups
    if ( Groupstatus(group,2) = = 0)
        nOff = nOff + l;
        offGroup(nOff) = group;
    elseif ( GroupStatus(group,4) > 0)
        nOpen = nOpen + 1;
        openGroup(nOpen) = group;
    end;
end;
if(nOpen = = O)
    if(nOff = = O)
        DropCall (User);      % System call
        status = -99;
        return;
    else
        stat = OnGroup( offGroup(1), User);
        status = stat;
        return;
    end;
else
    for i = 1:nOpen
        group = openGroup(i);
        groupX = GroupStatus(group,5);
        groupY = GroupStatus(group,6);
        d2Group(i) = sqrt( (groupX-userX)^2 + (groupY-userY)^2 );
    end;
    [sorted,indi] = sort(d2Group);
    nGood = O;
    for i = 1:nOpen
        testGroup = indi(i);
        if ( testGroup != oldGroup | sorted(i) < DSynch )
            nGood = nGood +1;
            goodGroup(nGood) = testGroup;
        end;
    end;
    if( nGood = = O )
        if ( nOff = = O )
            DropCall ( User );     % System call
            status = -99;
            return;
        else
            stat = OnGroup( offGroup(1), User);
            status = stat;
            return;
        end;
    else
        for i = 1:nGood
            group = goodGroup(i);
            stat = Add2Group( group, User );
            if ( stat == 1 )
                status = stat;
                return;
            endif;
        end;
        if ( nOff = = O )
            DropCall ( User );     % System call
            status = -99;
            return;
        else
            stat = OnGroup( offGroup(1), User);
            status = stat;
            return;
        end;
```

TABLE 2-continued

Control Code For User Group Operations.
COPYRIGHT © 1996 Cellular Telecom, Ltd.

```
    end;
    return;
end;
function status = DropUser( Group, User )
slot = UserStatus(User,3);
GroupSlots(Group,slot,2) = 0;
GroupSlots(Group,slot,3) = 0;
GroupStatus(Group,4) = GroupStatus(Group,4) +1;
if ( GroupStatus(Group,4) = = GroupStatus(Group,3) )
    GroupStatus(Group,2) = 0;
end;
UserStatus(User,l) = 0;
UserStatus(User,2) = 0;
UserStatus(User,3) = 0;
UserStatus(User,6) = -1;
status = 1;
return;
end;
function status = OnGroup( Group, User )
if ( GroupStatus(Group,2) = = 1 )
    status = -13;
    return;
end;
if ( UserStatus(User,2) = = 1 )
    doHandoff = 1;
    oldGroup = UserStatus(User,2);
    oldSlot = UserStatus(User,3);
end;
userX = UserStatus(User,4);
userY = UserStatus(User,5);
d2Broad = sqrt( (BroadLoc(1)-userX)^2 +(BroadLoc(2)-userY)^2 );
for coll = 1:NColls
    collX = CollLoc(1)(coll,1);
    collY = CollLoc(coll,2);
    d2Coll(coll) = sqrt( (collX-userX)^2 + (collY-userY)^2 );
end;
[sorted,indi] = sort(d2Coll);
for i = 1:NColls2Use
    GroupColls(Group,i,l) = indi(i);
    GroupColls(Group,i,2) = sorted(i);
    CollStatus(indi(i),Group) = 1;
    ModColl( indi(i) );      % System call
end;
GroupStatus(Group,2) = 1;
GroupStatus(Group,4) = GroupStatus(Group,3)-l;
GroupStatus(Group,5) = userX;
GroupStatus(Group,6) = userY;
GroupStatus(Group,7) = d2Broad;
GroupStatus(Group,8) = NColls2Use;
GroupSlots(Group,1,2) = 1;
GroupSlots(Group,1,3) = User;
if( doHandoff == 1 )
    GroupSlots(oldGroup,2) = 0;
    GroupSlots(oldGroup,3) = 0;
    GroupStatus(oldGroup,4) = GroupStatus(oldGroup,4) + 1;
    if ( GroupStatus(oldGroup,4) = = GroupStatus(oldGroup,3) )
        GroupStatus(oldGroup,2) = 0;
    end;
    stat = UpdateGroup( oldGroup );
end;
UserStatus(User,2) = Group;
UserStatus(User,3) = 1;
UserStatus(User,6) = sorted(1);
UserStatus(User,7) = d2Broad;
UserStatus(User,8) = ( d2Broad + sorted(1) )/LightSpeed;
ModUser( User )      % System call
return;
end;
function status = Add2Group ( Group, User )
nSlots = GroupStatus(Group,3);
nUsers = 0;
sumX = 0;
sumY = 0;
for i = 1:nSlots
    if (GroupSlots(Group,i,2) = = 1 )
        nUsers = nUsers + 1;
```

TABLE 2-continued

Control Code For User Group Operations.
COPYRIGHT © 1996 Cellular Telecom, Ltd.

```
            user(nUsers) = GroupSlots(Group,i,3);
            userX(nUsers) = UserStatus(user(nUsers),4);
            userY(nUsers) = UserStatus(user(nUsers),5);
            sumX = sumX + userX(nUsers);
            sumY = sumY + userY(nUsers);
            d2Broad(nUsers) = UserStatus(user(nUsers),7);
        end;
end;
newCenX = sumX/nUsers;
newCenY = sumY/nUsers;
for i = 1,nUsers
    newDG = sqrt( (userX(i)-newCenX)^2 +(userY(i)-newCenY)^2 );
    if ( newDG > Dsynch )
        status = -14;
        return;
    end;
end;
GroupStatus(Group,4) = GroupStatus(Group,4) - 1;
GroupStatus(Group,5) = newCenX;
GroupStatus(Group,6) = newCenY;
UserStatus(User,2) = Group;
for i = 1:nSlots
    if ( GroupSlots(Group,i,2) = = 0 );
        slot = i;
        GroupSlots(Group,i,2) = 1;
        GroupSlots(Group,i,3) = User;
        UserStatus(User,3) = slot;
        break;
    end;
end;
nGColls = GroupStatus(Group,7)
uX = UserStatus(User,4);
uY = UserStatus(User,5);
for coll = 1:nGColls
    collX = CollLoc(GroupColls(newGroup,coll),1);
    collY = CollLoc(GroupColls(newGroup,coll),2);
    d2Coll(coll) = sqrt( (collX-uX)^2 + (collY-uY)^2);
end;
[sorted,indi] = sort(d2Coll);
UserStatus(User,8) = (UserStatus(User,7) + sorted(l) )/LightSpeed;
status = 1;
return;
end;
function status = UpdateGroup ( Group )
nSlots = GroupStatus(Group,3);
nUsers = 0;
sumX = 0;
sumY = 0;
for i = 1:nSlots
    if (GroupSlots(Group,i,2) = = 1 )
        nUsers = nUsers + 1;
        user(nUsers) = GroupSlots(Group,i,3);
        userX(nUsers) = UserStatus(user(nUsers),4);
        userY(nUsers) = UserStatus(user(nUsers),5);
        sumX = sumX + userX(nUsers);
        sumY = sumY + userY(nUsers);
        d2Broad(nUsers) = UserStatus(user(nUsers),7);
    end;
end;
newCenX = sumX/nUsers;
newCenY = sumY/nUsers;
for i = 1,nUsers
    newDG(i) = sqrt( (userX(i)-newCenX)^2 + (userY(i)-newCenY)^2);
end;
[sorted,indi] = sort(newDG);
for i = 1,nUsers
    if ( sorted(i) > DSynch )
        stat = AddUser( user(indi(i)) );
        if(stat != 1)
            stat = DropUser( User );
        end;
        stat = UpdateGroup( Group)
    end;
end;
GroupStatus(Group,5) = newCenX;
GroupStatus(Group,6) = newCenY;
```

TABLE 2-continued

Control Code For User Group Operations.
COPYRIGHT © 1996 Cellular Telecom, Ltd.

```
for coll = 1:NColls
    collX = CollLoc(coll,1);
    collY = CollLoc(coll,2);
    d2Coll(coll) = sqrt( (collX-newCenX)^2 + (collY-newCenY)^2 );
end;
[sorted,indi] = sort(d2Coll);
for i = 1:NColls2Use
    GroupColls(Group,i,1) = indi(i);
    GroupColls(Group,i,2) = sorted(i);
    CollStatus(indi(i),Group) = 1;
    ModColl( indi(i) );       % System call
end;
d2Coll = zeros(1,GroupStatus(Group,7);
for i = 1:nUsers
    userX = UserStatus(users(i),4);
    userY = UserStatus(users(i),5);
    UserStatus(users(i),6) =
        sqrt( (newCenX-userX)^2 +(newCenY-userY)^2 );
    d2Broad = UserStatus(users(i),7);
    for j = 1:GroupStatus(Group,7)
        coll = GroupColls(Group,j,1);
        collX = CollLoc(coll,1);
        collY = CollLoc(coll,2);
        d2Coll(j) = sqrt( (collX-userX)^2 + (collY-userY)^2 );
    end;
    sorted = sort(d2Coll);
    UserStatus(users(i),8) = (d2Broad +sorted(1) )/LightSpeed;
    ModUser( users(i) );    % System call
end;
status = stat;
return;
end;
```

Under one embodiment of the present invention and for purposes of explanation, all Cc collectors assigned to receive the particular carrier utilized by the user group have their time bases $TB_{Cc}$ set so that they receive bursts from the particular $U_1$ user for which the total propagation time, $T_f(B:U_1)+T_r(U_1:Cc)$, is shortest. This relationship is depicted in FIG. 9 for the Cc collector C1 representative of any collector. The synchronization is performed for any particular other user $U_2$ in the user group at any arbitrarily located collector Cc, C1 in the FIG. 9 example, which has been synchronized for user $U_1$. This synchronization is depicted in FIG. 10, where the distances from the B broadcaster to the $U_1$ and $U_2$ users have been abbreviated as $D_{B:1}$ and $D_{B:2}$, the distances from the $U_1$ and $U_2$ users to the C1 collector have been abbreviated as $D_{1:C1}$ and $D_{2:C1}$, and the distance between the two users has been abbreviated $D_{1:2}$. The synchronization requirement can then be stated as $$D_{B:1}+D_{1:Cc}-(D_{B:2}+D_{2:Cc})<D_G \qquad \text{Eq. (17)}$$

or $$|D_{B:1}-D_{B:2}+D_{1:Cc}-D_{2:Cc}|<D_G \qquad \text{Eq. (18)}$$

The left-hand side of Eq. (18) is maximized for $\phi=0$ and $\theta=-\pi$ at the value $2D_{1:2}$. Thus the synchronization condition for the user group can be stated as: no two users in the user group can be farther apart than a distance $UR_{max}$, where for example, $UR_{max}$ equals the distance $D_G/2$. If all pairs of users within the user group satisfy this pairwise condition, then synchronized TDMA communications at full capacity are possible within the present invention of arbitrary range extension. Under one embodiment of the present invention, this user location requirement is satisfied by requiring that all users be located within a circle of radius $D_G/4$ about a group center established as the center for all users in the group.

More complex operations which combine user and collector groupings to achieve synchronization are possible. These operations are especially useful in specific geometries, such as exist for mobile users confined to a highway.

Aggregation Operations

Figure 11:
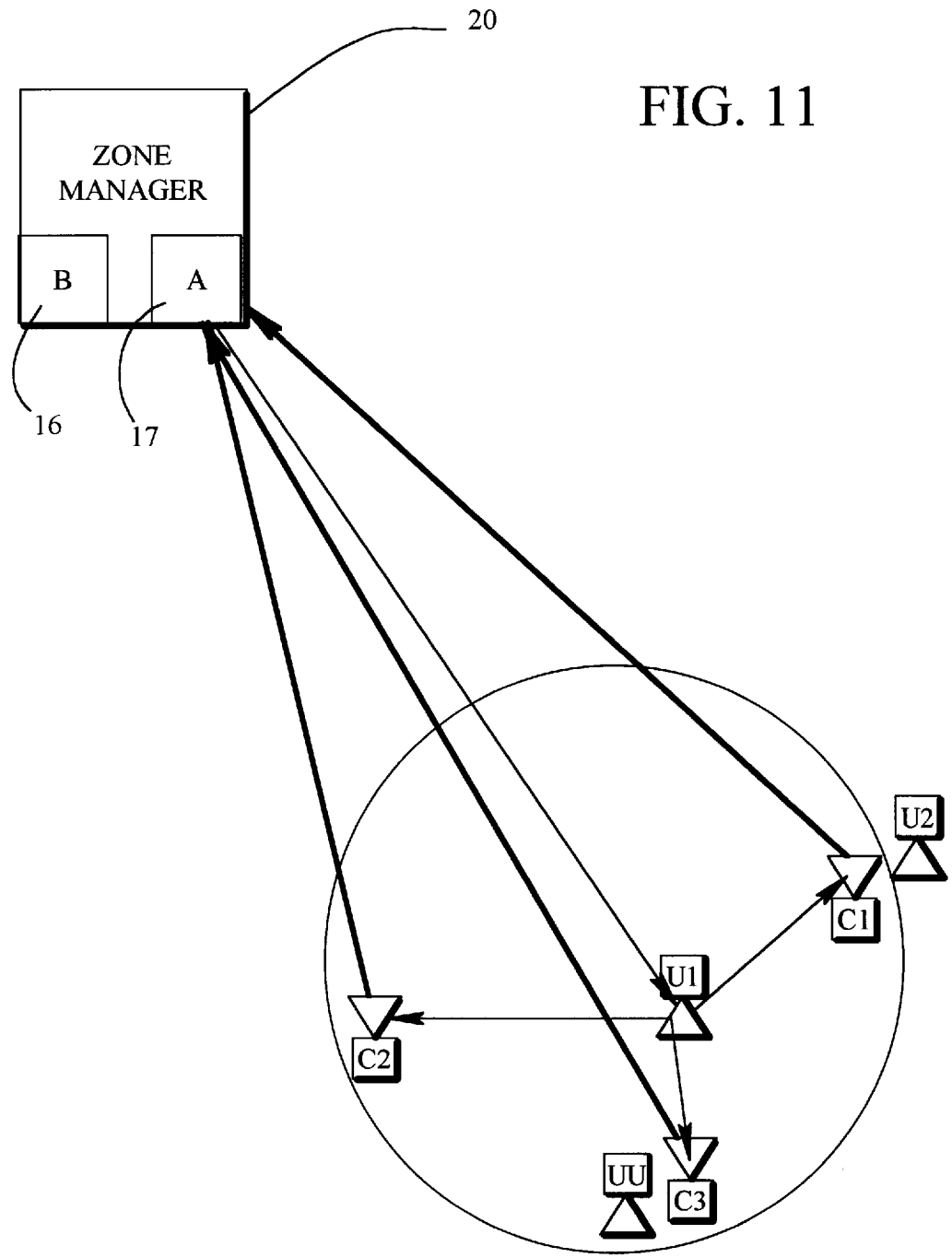
FIG. 11 depicts a user group from the FIG. 1 system which has signals from each single user transmitted to multiple collectors of a collector array.
Figure 12:
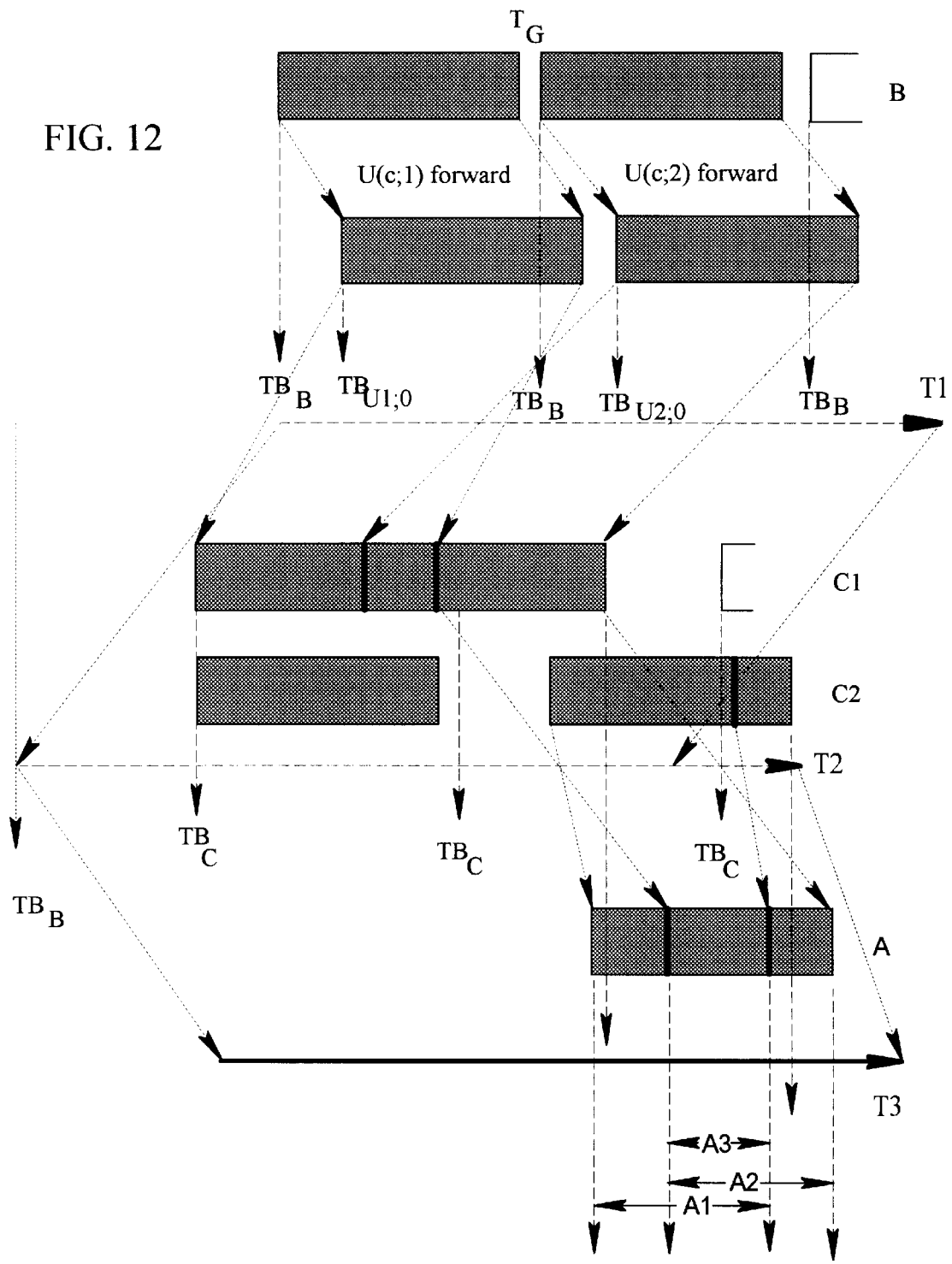
FIG. 12 depicts the time slot timing of an embodiment of the FIG. 11 system in which signals from each of a number of users are transmitted to different collectors and are aggregated to form a composite user signal for each user.

In FIG. 12, a multi-user, multi-collector embodiment is shown where users are any arbitrary range $BR_1$ from a broadcaster B. In the FIG. 11 system, the collectors C1, C2, and C3 of the collector group Cc return the radio communication signals they receive from users, such as users U1, U2, . . . , UU, to the aggregator (A) 17. At the aggregator, the separate returns from the various collectors C1, C2, and C3 that receive transmissions from a particular user are combined to produce a combined signal with a quality, measured by metrics such as the bit error rate (BER), that is higher than that of the separate signals from only one collector. Under one embodiment of the present invention, synchronization is not strictly followed in the sense that bursts from users are allowed to collide (interfere with each other) at collectors. For each user, the aggregator processes parts of bursts from different collectors and those parts of each burst which are not clear, as determined by BER or other measurements, are discarded and those parts that are clear are combined to provide a composite signal. This operation is depicted in FIG. 12.

The aggregator is a digital signal processor for processing the particular collector reverse channel signals from particular ones of the collectors to form the aggregator reverse channel signals as a representation of the user reverse channel signals. Further details concerning the structure and operation of the aggregator are described in the above-identified cross-referenced application.

As in FIG. 4, the time lines T1 and T2 refer to communications within a TDMA implementation with a fixed timing offset between forward and reverse channel communications. The time line T3 refers to an offset which could be defined between the collector time base for receiving communications from users and the time base for sending those communications back to the aggregator. If the aggregator time base $TB_A$ were set equal to the broadcaster time base $TB_B$, this offset would correspond to the collector time base offset $\Delta C1$ and $\Delta C2$ plus any additional time added to allow for signal processing at the collectors.

In FIG. 12, the collectors C1 and C2 each receive the reverse channel signals from the users U1 and U2, by way of example. The timing of U1 with respect to C1 is the same as described in connection with FIG. 4 for user U(c;1). The timing for U2 in FIGS. 11 and 12 differs in that U2 is close to C1 but far from C2. Consequently, a portion of the U2 burst collides with U1 at collector C1. Also, U2 is far from C2 and tends to be delayed at C2 and may collide with bursts from other users, such as user UU. Neither collector C1 nor collector C2 has a full uncollided burst from the user U2, but each has a useable portion of the U2 burst. The aggregator 17 in FIG. 11 processes the bursts from collectors C1 and C2 taking the A1 portion from collector C1 and the A2 portion from collector C2. Portions A1 and A2 overlap in a portion A3 that can be used from either collector C1 or C2, or from both.

While FIG. 12 has been described in connection with portions from two collectors portions of bursts from any number of collectors can be combined. The combination is controlled such that all parts of the full burst from each user are received without interference at some collector within the UR user range for each user.

We claim:

1. A communication system having a plurality of forward channel communications and a plurality of corresponding reverse channel communications comprising, a plurality of users in a broadcaster zone,
   each of said users including user receiver means for receiving different user forward channel signals and including user transmitter means for broadcasting user reverse channel signals in a different user reverse channel,
   said plurality of users providing a plurality of different user reverse channel signals that collectively constitute composite signals,
a plurality of collector means distributed in proximity to said broadcaster zone at spaced-apart locations, each of said collector means including,
   collector receiver means for receiving said composite signals, including said user reverse channel signals, and
   collector forwarding means for forwarding said user reverse channel signals as collector reverse channel signals,
zone manager means including,
   control means for selecting two or more of said plurality of users to form a user group and for selecting two or more of said plurality of collector means to form a collector group,
   broadcaster means including a broadcaster transmitter for broadcasting said plurality of user forward channel signals over a broadcaster range to said user group in said broadcaster zone,
   aggregator means for receiving said plurality of collector reverse channel signals from said two or more of said plurality of collector means in said collector group.

2. The communication system of claim 1 wherein said control means selects said two or more of said plurality of users and said two or more of said plurality of collector means such that user reverse channel signals at each of said collector means are isolated.

3. The communication system of claim 1 wherein said control means selects said two or more of said plurality of users and said two or more of said plurality of collector means such that the differences between the sum for each user of the user forward channel signals' propagation time from broadcaster to user and the corresponding user reverse channel signals' propagation time from user to collector means for pairs of users having user reverse channel signals active at the same collector means does not exceed a synchronization error such that user reverse channel signals at said same collector means are isolated for said pairs of users.

4. The communication system of claim 3 wherein said control means selects said two or more of said plurality of users such that each of said users in said user group is located at a distance from each of said other users in said user group not greater than a distance $UR_{max}$ where $UR_{max}$ is a value such that user reverse channel signals at said collector means are isolated.

5. The communication system of claim 4 having guard periods, $T_G$, between time slots for operating with a TDMA protocol where the guard periods establish a guard period distance, $D_G$, wherein said distance $UR_{max}$ is approximately equal to one half the guard period distance $D_G$.

6. The communication system of claim 5 wherein said users in said user group are located within a circle of radius $D_G/4$.

7. The communication system of claim 3 wherein said control means selects said two or more of said plurality of collector means such that each of said collector means in said collector group is located at a distance from each other of said collector means in said collector group not greater than a distance $CR_{max}$ where $CR_{max}$ is a value such that user reverse channel signals at said collector means are isolated.

8. The communication system of claim 7 having guard periods, $T_G$, between time slots for operating with a TDMA protocol where the guard periods establish a guard period distance, $D_G$, wherein said distance $CR_{max}$ is approximately equal to the guard period distance $D_G$.

9. The communication system of claim 8 wherein said collectors in said collector groups are located within a circle of radius $D_G/2$.

10. The communication system of claim 1 wherein said aggregator means combines the user reverse channel signals for each of said users from a plurality of said collector means to form a combined signal where the combined signal for each of said users is isolated from the combined signal for each of the other users irrespective of whether or not the user reverse channel signals received at ones of said collector means are isolated.

11. The communication system of claim 1 having long guard periods, $T_{LG}$, between time slots for operating with a TDMA protocol where the long guard periods establish long guard period distances, $D_{LG}$, wherein unsynchronized ones of said users are synchronized in said broadcaster zone when said unsynchronized ones of said users are within a distance $D_{LG}$ of any collector means irrespective of the distances of said unsynchronized ones of said users from said broadcaster means.

12. A communication system having a plurality of forward channel communications and a plurality of corresponding reverse channel communications comprising, a plurality of users in a broadcaster zone,
each of said users including user receiver means for receiving different user forward channel signals and including user transmitter means for broadcasting user reverse channel signals in a different user reverse channel,
said plurality of users providing a plurality of different user reverse channels each of said user reverse channels occupying a different user reverse channel bandwidth,
one or more collector means each located at a collector location in proximity to said broadcaster zone, each of said collector means including,
collector receiver means for receiving said user reverse channels from ones of said plurality of users, and
collector forwarding means for forwarding said user reverse channels from said ones of said plurality of users as collector reverse channel signals,
zone manager means including,
control means for selecting as a user group two or more of said plurality of users that are located within a distance of at least one of said collector means such that a synchronization error for each of said two or more of said plurality of users is less than a predetermined value,
broadcaster means having a broadcaster transmitter for broadcasting to said two or more of said plurality of users within said user group said plurality of forward channel signals using broadcaster signals to form a plurality of broadcaster forward channels in said broadcaster zone,
aggregator means for receiving said plurality of corresponding reverse channel signals from said collector means.

13. The communication system of claim 12 wherein said communications are according to a TDMA protocol having frames formed of a plurality of time slots, each time slot specified as including an information period and a guard period, said guard period provided as a buffer zone that can be occupied by an information period without said information period colliding with an information period of adjacent time slots.

14. The communication system of claim 12 wherein said control means selects said two or more of said plurality of users and said two or more of said plurality of collector means such that user reverse channel signals at said collector means are isolated.

15. The communication system of claim 12 wherein said control means selects said two or more of said plurality of users and said two or more of said plurality of collector means such that the difference between the sum for each user of the user forward channel signals' propagation time from broadcaster to user and the corresponding user reverse channel signals' propagation time from user to collector means for two users having user reverse channel signals active at the same collector means does not exceed a synchronization error such that user reverse channel signals at said same collector means are isolated for said two users.

16. The communication system of claim 15 wherein said control means selects said two or more of said plurality of users such that each of said users in said user group is located at a distance from each of other of said users in said user group not greater than a distance $UR_{max}$ where $UR_{max}$ is a value such that user reverse channel signals at said collector means are isolated.

17. The communication system of claim 16 having guard periods, $T_G$, between time slots for operating with a TDMA protocol where the guard periods establish a guard period distance, $D_G$, wherein said distance $UR_{max}$ is approximately equal to one half the guard period distance $D_G$.

18. The communication system of claim 16 wherein said users in said user group are located within a circle of radius $D_G/4$.

19. The communication system of claim 15 wherein said control means selects said two or more of said plurality of collector means such that each of said collector means in said collector group is located at a distance from each other of said collector means in said collector group not greater than a distance $CR_{max}$ where $CR_{max}$ is a value such that user reverse channel signals at said collector means are isolated.

20. The communication system of claim 19 having guard periods, $T_G$, between time slots for operating with a TDMA protocol where the guard periods establish a guard period distance, $D_G$, wherein said distance $CR_{max}$ is approximately equal to the guard period distance $D_G$.

21. The communication system of claim 20 wherein said users in said user group are located within a circle of radius $D_G/2$.

22. The communication system of claim 12 wherein said aggregator means combines the user reverse channel signals for each of said users from a plurality of said collector means to form a combined signal where the combined signal for each of said users is isolated from the combined signal for each of other of said users even where the user reverse channel signals received at ones of said collector means are not isolated.

23. The communication system of claim 12 having long guard periods, $T_{LG}$, between time slots for operating with a TDMA protocol where the long guard periods establish a long guard period distance, $D_{LG}$, wherein unsynchronized ones of said users are synchronized in said broadcaster zone when said unsynchronized ones of said users are within a distance $D_{LG}$ of any collector means irrespective of the distances of said unsynchronized ones of said users from said broadcaster means.

24. A communication system having a plurality of forward channel communications and a plurality of corresponding reverse channel communications having long guard periods, $T_{LG}$, between time slots for operating with a TDMA protocol where the long guard periods establish long guard period distances, $D_{LG}$, comprising, a plurality of users in a broadcaster zone,
      each of said users including user receiver means for receiving a different user forward channel and including user transmitter means for broadcasting user reverse channel signals in a different user reverse channel,
      said plurality of users providing a plurality of different user reverse channels each of said user reverse channels occupying a different user reverse channel bandwidth in a broadcast range,
   one or more collector means each located at a collector location in proximity to said broadcaster zone, each of said collector means including,
      collector receiver means for receiving said user reverse channel signals from ones of said plurality of users, and
      collector forwarding means for forwarding said user reverse channel signals from said ones of said plurality of users as collector reverse channel signals,
   zone manager means including,
      broadcaster means located at a broadcaster location within said broadcaster zone,
      control means for selecting as a user group two or more of said plurality of users that are located any arbitrary distance from said broadcaster location and that are located within one of said long guard period distances, $D_{LG}$, of any one of said collector means,
      broadcaster means including a broadcaster transmitter for broadcasting said plurality of user forward channel signals with a broadcaster range to said user group in said broadcaster zone,
      aggregator means for receiving said collector reverse channel signals.

25. The communication system of claim 24 wherein said control means selects said two or more of said plurality of users such that user reverse channel signals at each of said one of said collector means are isolated.

26. The communication system of claim 24 wherein said control means selects said two or more of said plurality of users such that the differences between the sum for each user of the user forward channel signals' propagation time from broadcaster to user and the corresponding user reverse channel signals' propagation time from user to collector means for pairs of users having user reverse channel signals active at the same collector means does not exceed a synchronization error such that user reverse channel signals at said same collector means are isolated for said pairs of users.

27. The communication system of claim 26 wherein said control means selects said two or more of said plurality of users such that each of said users in said user group is located at a distance from each other of said users in said user group not greater than a distance $UR_{max}$ where $UR_{max}$ is a value such that user reverse channel signals at said collector means are isolated.

28. The communication system of claim 27 having normal guard periods, $T_G$, between time slots for operating with a TDMA protocol where the normal guard periods establish a guard period distance, $D_G$, wherein said distance $UR_{max}$ is approximately equal to one half the guard period distance $D_G$.

29. The communication system of claim 28 wherein said users in said user group are located within a circle of radius $D_G/4$.

30. The communication system of claim 26 wherein said control means selects two or more of said plurality of collector means as a collector group such that each of said collector means in said collector group is located at a distance from each other of said collector means in said collector group not greater than a distance $CR_{max}$ where $CR_{max}$ is a value such that user reverse channel signals at said collector means are isolated.

31. The communication system of claim 30 having normal guard periods, $T_G$, between time slots for with a TDMA protocol where the normal guard periods establish a guard period distance, $D_G$, wherein said distance $CR_{max}$ is approximately equal to the guard period distance $D_G$.

32. The communication system of claim 31 wherein said users in said user group are located within a circle of radius $D_G/2$.

33. The communication system of claim 26 wherein said aggregator means combines the user reverse channel signals for each of said users from a plurality of said collector means to form a combined signal where the combined signal for each of said users is isolated from the combined signal for each other of said users even where the user reverse channel signals at said collector means are not isolated.

34. A communication system for communicating between a network and one or more regions with a plurality of network forward channel communications from the network and with a plurality of corresponding network reverse channel communications to the network, said system including,
   one or more region manager means, one for each of said regions for controlling communications within a corresponding region where each particular region includes a plurality of broadcaster zones,
   for each broadcaster zone,
      a plurality of users, each of said users including user receiver means for receiving a different user forward channel and including user transmitter means for broadcasting user reverse channel signals in a different user reverse channel,
      said plurality of users providing a plurality of different user reverse channels each of said user reverse channels occupying a different user reverse channel bandwidth in a broadcast range,
      a plurality of collector means each located at a collector location within said broadcaster zone, each of said collector means including,
         collector receiver means for receiving said user reverse channel signals from ones of said plurality of users, each of said users forwarding a user reverse channel signal to two or more of said collector receiver means, and
         collector forwarding means for forwarding said user reverse channel signals from said ones of said plurality of users as collector reverse channel signals,
      for each broadcaster zone, zone manager means including, broadcaster means located at a broadcaster location within said broadcaster zone, control means for selecting as a user group two or more of said plurality of users that are located any arbitrary distance from said broadcaster location and that are located within a predetermined distance of any one or more of said collector means and for selecting two or more of said plurality of collectors means to form a collector group whereby two or more collector means in said collector group receive reverse channel signals from each of the same particular ones of said users, broadcaster means including a broadcaster transmitter for broadcasting said plurality of user forward channel signals over a broadcaster range to said user group in said broadcaster zone, aggregator means for receiving said plurality of corresponding reverse channel signals from said collector group, said aggregator means receiving user reverse channel signals for each of the same particular ones of said users from two or more collector means in said collector group.

35. The communication system of claim 34 wherein said control means selects said two or more of said plurality of users and said two or more of said plurality of collector means such that user reverse channel signals at each of said collector means are isolated.

36. The communication system of claim 34 wherein said control means selects said two or more of said plurality of users and said two or more of said plurality of collector means such that the differences between the sum for each user of the user forward channel signals' propagation time from broadcaster to user and the corresponding user reverse channel signals' propagation time from user to collector means for pairs of users having user reverse channel signals active at the same collector means does not exceed a synchronization error such that user reverse channel signals at said same collector means are isolated for said pairs of users.

37. The communication system of claim 36 wherein said control means selects said two or more of said plurality of users such that each of said users in said user group is located at a distance from each other of said users in said user group not greater than a distance $UR_{max}$ where $UR_{max}$ is a value such that user reverse channel signals at said collector means are isolated.

38. The communication system of claim 37 having normal guard periods, $T_G$, between time slots for operating with a TDMA protocol where the normal guard periods establish a guard period distance, $D_G$, wherein said distance $UR_{max}$ is approximately equal to one half the guard period distance $D_G$.

39. The communication system of claim 38 wherein said users in said user group are located within a circle of radius $D_G/4$.

40. The communication system of claim 36 wherein said control means selects said two or more of said plurality of collector means such that each of said collector means in said collector group are located at a distance from each other of said collector means in said collector group not greater than a distance $CR_{max}$ where $CR_{max}$ is a value such that user reverse channel signals at said collector means are isolated.

41. The communication system of claim 40 having normal guard periods, $T_G$, between time slots for operating with a TDMA protocol where the normal guard periods establish a guard period distance, $D_G$, wherein said distance $CR_{max}$ is approximately equal to the guard period distance $D_G$.

42. The communication system of claim 41 wherein said users in said user group are located within a circle of radius $D_G/2$.

43. The communication system of claim 36 wherein said aggregator means combines the user reverse channel signals for each of said users from a plurality of said collector means to form a combined signal where the combined signal for each of said users is isolated from the combined signal for each other of said users even where the user reverse channel signals received at ones of said collector means are not isolated.

44. The communication system of claim 34 wherein, for a particular broadcaster zone, ones of said user transmitter means broadcast in user zones that are substantially smaller than said broadcaster zone and wherein a plurality of said collector means are located within said user zones.

45. The communication system of claim 34 wherein said broadcaster transmitter is controllable for varying the transmission power for each of said broadcaster forward channels whereby the transmission power and broadcaster range for each broadcaster forward channel is individually controllable.

46. The communication system of claim 34 wherein said user transmitter for each user is controllable for varying the transmission power of said user reverse channels whereby the user range for each user is controllable for reaching a plurality of said collector means.

47. The communication system of claim 34 wherein said collector forwarding means includes collector transmitter means for transmitting said collector reverse channel signals with transmission characteristics that isolate the collector reverse channel signals from the user reverse channel signals.

48. The communication system of claim 34 wherein particular user reverse channel signals broadcast from a particular user transmitter means are received by particular ones of said collector means and wherein said particular ones of said collector means each forwards particular collector reverse channel signals corresponding to said user reverse channel signals to said aggregator means and wherein said aggregator means includes aggregator processing means for processing said particular collector reverse channel signals from said particular ones of said collector means to form said aggregator reverse channel signals as a representation of said user reverse channel signals.

49. The communication system of claim 48 wherein said aggregator processing means is a digital signal processor for processing said particular collector reverse channel signals from said particular ones of said collector means to form said aggregator reverse channel signals as a representation of said user reverse channel signals.

50. The communication system of claim 34 wherein a particular one of said users is mobile and travels from a first location to a second location, said transmitter means for said particular one of said users broadcasting particular user reverse channel signals and wherein, at said first location, said particular user reverse channel signals are received by a first group of particular two or more of said collector means and wherein each collector means of said first group of particular two or more of said collector means forwards to said aggregator means first particular collector reverse channel signals corresponding to said particular user reverse channel signals;

at said second location, said particular user reverse channel signals are received by a second group of particular two or more of said collector means and wherein each collector means of said second group of particular two or more of said collector means forwards to said aggregator means second particular collector reverse channel signals corresponding to said particular user reverse channel signals;

said aggregator means receives said first and second particular collector reverse channel signals and includes aggregator processing means for processing said first and second particular collector reverse channel signals to form said aggregator reverse channel signals as a representation of said user reverse channel signals.

51. The communication system of claim 50 wherein said one or more of said collector means is common to said first group and said second group.

52. The communication system of claim 50 wherein said user transmitter means for said particular one of said users broadcast in a user zone that is substantially smaller than said broadcaster zone and that moves when said particular user moves from said first location to said second location and wherein, at said first location, said first group of particular two or more of said collector means are located within said user zone and wherein, at said second location, said second group of particular two or more of said collector means are located within said user zone.

53. The communication system of claim 50 wherein said broadcaster transmitter is controllable for varying the transmission power for each of said broadcaster forward channels whereby the transmission power and broadcaster range for each broadcaster forward channel is individually controllable, wherein when said particular user is at said first location a particular broadcaster forward channel has a first power level so that said broadcaster range extends to said first location and wherein when said particular user is at said second location said particular broadcaster forward channel has a second power level so that said broadcaster range extends to said second location.

54. The communication system of claim 50 wherein said user transmitter for said particular user is controllable for varying transmission power of a particular user reverse channel for said particular user whereby the user range for said particular user is controllable and wherein, when said particular user is at said first location, said particular user reverse channel has a first power level so that said user range extends to said first group of particular two or more of said collector means and wherein, when said particular user is at said second location, said particular user reverse channel has a second power level so that said user range extends to said second group of particular two or more of said collector means.

55. The communication system of claim 50 wherein said collector transmitter means is a transmitter for transmitting said collector reverse channel signals with transmission characteristics that isolate the collector reverse channel signals from the user reverse channel signals.

56. The communication system of claim 34 wherein said zone manager means includes control means for assigning a broadcaster forward channel and a user reverse channel for a particular user under control of said region manager means.

57. The communication system of claim 34 wherein said region manager means includes means for assigning forward channels and reverse channels with a reuse pattern.

58. The communication system of claim 34 wherein said region manager means stores a fixed reuse pattern and said zone manager means includes control means for assigning a broadcaster forward channel and a user reverse channel for a particular user according to said fixed reuse pattern under control of said region manager means.

59. The communication system of claim 34 wherein said region manager means includes dynamic control means for dynamic channel allocation and wherein said zone manager means includes control means for assigning a broadcaster forward channel and a user reverse channel for a particular user according to said dynamic channel allocation under control of said region manager means.

60. A communication system having a plurality of forward channel signals and a plurality of corresponding reverse channel signals for operating with a TDMA protocol having long guard periods, $T_{LG}$, between time slots for synchronization transfers where the long guard periods establish long guard period distances, $D_{LG}$, and having normal guard periods, $T_G$, between time slots for normal transfers where the normal guard periods establish normal guard period distances, $D_G$, comprising, a plurality of users in a broadcaster zone,
  each of said users including user receiver means for receiving a different user forward channel and including user transmitter means for broadcasting user reverse channel signals in a different user reverse channel,
  said plurality of users providing a plurality of different user reverse channels each of said user reverse channels occupying a different user reverse channel bandwidth and said user reverse channel signals collectively forming a composite signal,
one or more collector means each located at a collector location for receiving user reverse channels from one or more of said plurality of users, each of said collector means including,
  collector receiver means for receiving said composite signal including said user reverse channel signals, and
  collector forwarding means for forwarding said user reverse channel signals as collector reverse channel signals,
zone manager means including,
  broadcaster means located at a broadcaster location within said broadcaster zone,
  control means for selecting two or more of said plurality of users to form user groups and for selecting two or more of said plurality of collectors means to form collector groups,
  said control means selecting as one of said user groups two or more of said plurality of users that are located any arbitrary distance from said broadcaster location and that are located within one of said long guard said distances, $D_{LG}$, of any one of said collector means, said control means selecting two or more of said plurality of collector means to form one of said collector groups whereby two or more collector means in said collector group receive reverse channel signals from each of the same particular two or more of said plurality of users, said control means controlling transfers to said users in said one of said user groups with one of said long guard periods for synchronization transfers and with one of the normal guard periods for normal transfers,
  said control means selecting said two or more of said plurality of users and said two or more of said plurality of collectors such that the differences between the sum for each user of a user forward channel signal propagation time from broadcaster to user and a corresponding user reverse channel signal propagation time from user to collector means for pairs of users having user reverse channel signals active at the same collector means does not exceed a synchronization error such that user reverse channel signals at said same collector means are isolated for said pairs of users, said control means selecting said two or more of said plurality of users such that each of said users in said one of said user groups is located at a distance from each of said other users in said one of said user groups not greater than a distance $UR_{max}$ where $UR_{max}$ is a value such that user reverse channel signals at said collector means are isolated and wherein said distance $UR_{max}$ is approximately equal to one half of one of the guard period distances $D_G$, broadcaster means including a broadcaster transmitter for broadcasting said plurality of user forward channel signals with a broadcaster range to said user group in said broadcaster zone, aggregator means for receiving said plurality of corresponding reverse channel signals from said collector means, said aggregator means receiving user reverse channel signals for each particular user from two or more collector means in said collector group to form two or more aggregator received signals for each particular user, said aggregator means combining said two or more aggregator received signals to form a single combined signal for each particular user.

61. A communication system having a plurality of forward channel signals and a plurality of corresponding reverse channel signals for operating with a TDMA protocol having long guard periods, $T_{LG}$, between time slots for synchronization transfers where the long guard periods establish long guard period distances, $D_{LG}$, and having normal guard periods, $T_G$, between time slots for normal transfers where the normal guard periods establish normal guard period distances, $D_G$, comprising, a plurality of users in a broadcaster zone, each of said users including user receiver means for receiving a different user forward channel and including user transmitter means for broadcasting user reverse channel signals in a different user reverse channel, said plurality of users providing a plurality of different user reverse channels each of said user reverse channels occupying a different user reverse channel bandwidth and said user reverse channel signals in said user reverse channels collectively forming a composite signal, one or more collector means each located at a collector location for receiving user reverse channels from one or more of said plurality of users, each of said collector means including, collector receiver means for receiving said composite signal including said user reverse channel signals from ones of said plurality of users, and collector forwarding means for forwarding said user reverse channel signals from said ones of said plurality of users as collector reverse channel signals, zone manager means including, broadcaster means located at a broadcaster location within said broadcaster zone, control means for selecting two or more of said plurality of users to form user groups and for selecting two or more of said plurality of collectors means to form collector groups, said control means selecting as one of said user groups two or more of said plurality of users that are located any arbitrary distance from said broadcaster location and that are located within one of said long guard period distances, $D_{LG}$, of any one of said collector means, said control means selecting two or more of said plurality of collector means to form one of said collector groups whereby two or more collector means in said collector group receive reverse channel signals from each of the same particular two or more of said plurality of users, said control means controlling transfers to said users in said one of said user groups with one of said long guard periods for synchronization transfers and with one of said normal guard periods for normal transfers, said control means selecting said two or more of said plurality of users and said two or more of said plurality of collectors such that the differences between the sum for each user of a user forward channel signal propagation time from broadcaster to user and a corresponding user reverse channel signal propagation time from user to collector means for pairs of users having user reverse channel signals active at the same collector means does not exceed a synchronization error such that user reverse channel signals at said same collector means are isolated for said pairs of users, said control means selecting said two or more of said plurality of collector means such that each of said collector means in said one of said collector groups is located at a distance from each of other of said collector means in said one of said collector groups not greater than a distance $CR_{max}$ where $CR_{max}$ is a value such that user reverse channel signals at said collector means are isolated and wherein said distance $CR_{max}$ is approximately equal to one of said guard period distances, $D_G$, broadcaster means including a broadcaster transmitter for broadcasting said plurality of user forward channel signals with a broadcaster range to said user group in said broadcaster zone, aggregator means for receiving said plurality of corresponding reverse channel signals from said collector means, said aggregator means receiving user reverse channel signals for each particular user from two or more collector means in said collector group to form two or more aggregator received signals for each particular user, said aggregator means combining said two or more aggregator received signals to form a single combined signal for each particular user.

62. A method of operation in a communication system where the communication system includes, a plurality of forward channel signals and a plurality of corresponding reverse channel-signals, a plurality of users in a broadcaster zone, each of said users including user receiver means for receiving a different user forward channel and including user transmitter means for broadcasting user reverse channel signals in a different user reverse channel, said plurality of users providing a plurality of different user reverse channels for providing said user reverse channel signals collectively as a composite signal, a plurality of collector means distributed in proximity to said broadcaster zone at spaced-apart locations, each of said collector means including, collector receiver means for receiving said composite signal, including said user reverse channel signals, and collector forwarding means for forwarding said user reverse channel signals as collector reverse channel signals, zone manager means including control means, broadcaster means having a broadcaster transmitter and aggregator means, said method comprising selecting with said control means two or more of said plurality of users to form a user group, selecting with said control means two or more of said plurality of collectors means to form a collector group, broadcasting, with said broadcaster transmitter, said plurality of user forward channel signals over a broadcaster range to said user group in said broadcaster zone, receiving in said aggregator means said plurality of corresponding reverse channel signals from said one or more collector means.

* * * * *